US009122343B2

(12) United States Patent
Horiuchi et al.

(10) Patent No.: US 9,122,343 B2
(45) Date of Patent: Sep. 1, 2015

(54) FACILITATING OPERATION OF CONTROLS DISPLAYED IN A DISPLAY SURFACE INDEPENDENTLY OF THE SIZE OF THE DISPLAY SURFACE

(71) Applicant: International Business Machines Corporation, Armonk, NY (US)

(72) Inventors: Yoshio Horiuchi, Tokyo (JP); Takaaki Kawase, Tokyo (JP); Satoko Kinoshita, Tokyo (JP); Daisuke Maruyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/647,673

(22) Filed: Oct. 9, 2012

(65) Prior Publication Data

US 2013/0127750 A1    May 23, 2013

(30) Foreign Application Priority Data

Nov. 18, 2011    (JP) .................................. 2011-252384

(51) Int. Cl.
*G06F 3/041*    (2006.01)
*G06F 3/0488*    (2013.01)

(52) U.S. Cl.
CPC .......... *G06F 3/0416* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| 6,611,285 B1 * | 8/2003 | Morita ........................ 348/211.3 |
| 7,649,562 B2 * | 1/2010 | Misawa et al. ........... 348/333.01 |
| 2006/0092177 A1 | 5/2006 | Blasko | |

FOREIGN PATENT DOCUMENTS

| JP | 2002333951 A | | 11/2002 |
| JP | 2004152217 A | | 5/2004 |
| JP | 2007200002 A | * | 8/2007 |
| JP | 2010039614 A | | 2/2010 |

* cited by examiner

*Primary Examiner* — Joseph Haley
(74) *Attorney, Agent, or Firm* — Winstead, P.C.

(57) ABSTRACT

A method, computer program product and system for facilitating operation of controls displayed in a display surface independently of the size of the display surface. The system includes a touchscreen which displays a screen on the display surface and which inputs an operation point operated by a user on the display surface, and a conversion unit that defines a point which is in a predetermined positional relationship with an operation point operated by the user on the touchscreen as an operation point to be operated. In response to input of an operation on an edge of the display surface, the conversion unit may define as the operation point to be operated a point that is positioned in a center area of the display surface except its edges and that is in a predetermined positional relationship with the operation point at which the edge of the display surface was operated.

21 Claims, 15 Drawing Sheets

FACILITATING OPERATION OF CONTROLS DISPLAYED IN A DISPLAY SURFACE INDEPENDENTLY OF THE SIZE OF THE DISPLAY SURFACE

CROSS-REFERENCE TO RELATED APPLICATIONS

This application claims priority under 35 U.S.C. §119(a) from Japanese Patent Application No. 2011252384, filed on Nov. 18, 2011, the contents of which are incorporated herein by reference.

TECHNICAL FIELD

The present invention relates generally to a display device, and more particularly, to a display device that facilitates operation of controls displayed in a display surface independently of the size of the display surface.

BACKGROUND

Conventional devices with a touchscreen display operation buttons and the like on the display screen of the touchscreen and detect user's touches on the display position of an operation button, thereby executing the operation associated with the operation button.

When the display surface of such a touchscreen is small compared to the user's finger, however, the finger hides the display surface when operating the device, making it difficult for the user to see control buttons or the like while operating the device. Also, a control button to be operated is sometimes displayed in a small size for the user's finger, in which case operation of the button itself is difficult. When the size of the display surface of a touchscreen is large compared to the user's finger, a large movement of the finger touching the display surface is required, possibly making device operation difficult.

BRIEF SUMMARY

In one embodiment of the present invention, a method for facilitating operation of controls displayed in a display surface independently of a size of the display surface comprises displaying content on the display surface. The method further comprises inputting to an operation unit an operation point operated by a user, the operation unit being provided at a position different from the operation point for the content. In addition, the method comprises converting, by a processor, a point which is in a predetermined positional relationship on the display surface with operation points actually inputted by the user into the operation point for the content.

Other forms of the embodiment of the method described above are in a computer program product.

In another embodiment of the present invention, a system comprises a touchscreen which displays a screen on a display surface and which inputs an operation point operated by a user on the display surface. The system further comprises a conversion unit that defines a point which is in a predetermined positional relationship with an operation point actually operated by the user on the touchscreen as an operation point to be operated.

In another embodiment of the present invention, a system comprises a display surface of an oval or circular shape having a display portion with a curved edge. The system further comprises an operation unit provided on an edge of the display surface or outside of the display surface. In addition, the system comprises an input unit which inputs a point on the display surface as an operation point in response to an operation of the operation unit performed by a user.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The principles of the present invention will be described below with respect to various embodiments, though the embodiments are not intended to limit the present invention as defined by the claims. In addition, not all combinations of features described in the embodiments are essential for practicing the invention.

Figure 1:
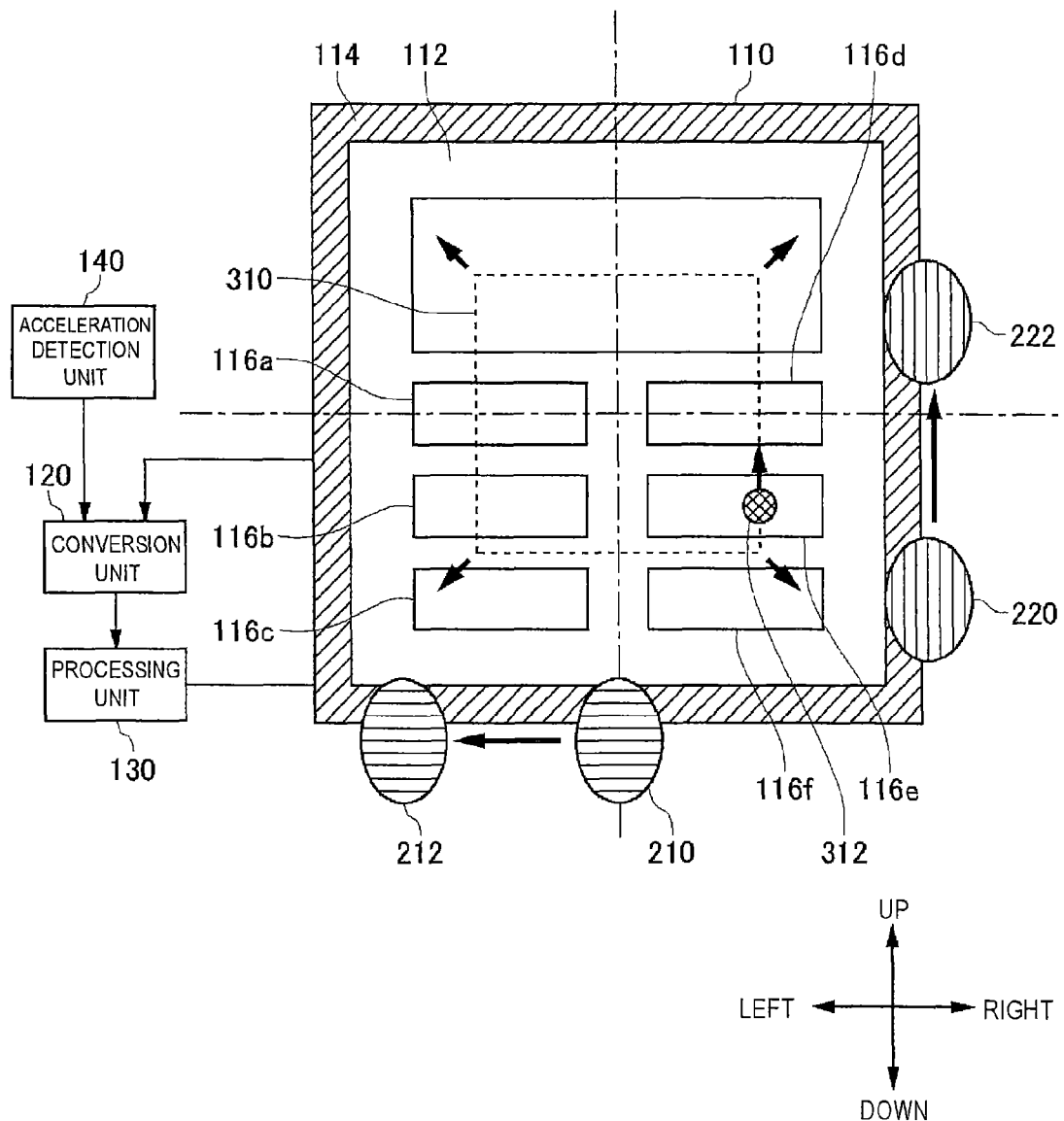
FIG. 1 illustrates an exemplary configuration of a display device according to an embodiment of the present invention.

Referring now to the Figures, FIG. 1 illustrates an exemplary configuration of a display device 100 according to an embodiment of the present invention. On the display device 100, the user can select and determine a control, such as an operation button, by operating an area of a touchscreen which is different from an area in which controls are displayed. The display device 100 may be incorporated into a mobile phone, portable information terminal, or an electronic device with a touchscreen, in which case the display device has the relevant device to perform processing corresponding to user's operations. The display device 100 includes a touchscreen 110, a conversion unit 120, and a processing unit 130.

The touchscreen 110 has a display surface 112, which displays a screen and which inputs an operation point on the display surface 112 manipulated by the user. The touchscreen 110 includes, for example, a display unit, which may be a liquid crystal panel or the like, and a touch position detection unit, which may be a touch sensor or the like, so that it detects the position of a touch by the user on the display unit. The touchscreen 110 detects user's actions, such as bringing a finger close to the display unit, touching the display unit, touching the display unit at least for a predetermined time period, sliding the finger while in contact with the display unit, and/or moving the finger away from the display unit.

The display surface 112 displays controls 116, characters, images, and/or content including moving pictures. The display surface 112 can enlarge or reduce the display to the screen size of the content being displayed. Alternatively, the display surface 112 may display a portion or the entirety of the content, optionally with a scroll bar or a slider with which the user can specify an enlarged or a reduced display.

As the controls 116 for inputting user's operations, the display surface 112 may display graphical user interface components, such as a button to serve as a push button, a radio button for selecting one of multiple options, a checkbox for allowing the selection of one or more of the multiple options, a slider to linearly move an indicator or the like, a spin button to assist in a numerical value entry, a scroll bar, a list box, a drop-down list, a menu, a tool bar, an icon, and a text box, for example. The display surface 112 in the figure represents an example of displaying controls 116a to 116f as six push buttons. The display surface 112 includes an edge 114.

The edge 114 serves as a touch position detection unit provided with a predefined width on at least one of the upper, lower, left, and right edges of the display surface 112. The edge 114 serves as a touch position detection unit, which corresponds to the number of peripheral dots of the display surface 112, for example. The edge 114 is an operation area actually operated by the user on the touchscreen 110. Although the edge 114 is depicted to cover all of the four sides of the rectangular display surface 112 in the figure, the edge 114 may instead be one or more of the sides of the display surface 112. The edge 114 may also be part of a side edge.

On the touchscreen 110 thus configured, the user manipulates the controls 116 on the display surface 112 through an action of bringing a finger into contact with or moving the finger away from the edge 114, for example. On the edge 114 in the figure, operation points 210, 212, 220, and 222 are depicted as example operation points at which user input is detected.

The conversion unit 120 defines a point that is in a predetermined positional relationship with an operation point actually operated by the user on the touchscreen 110 as an operation point to be operated 312. When an operation on the edge 114 of the display surface 112 is inputted, the conversion unit 120 defines a point that is in a predetermined positional relationship with the operation point at which the edge 114 of the display surface 112 was operated and that is positioned in a center area except the edge 114 of the display surface 112 as the operation point to be operated 312. In the present embodiment, the conversion unit 120 defines a point within the display surface 112 as the operation point to be operated 312 based on the operation points 210, 212, 220 and 222 on the edge 114 actually operated by the user.

In response to the user's input of a first operation point 210, the conversion unit 120 defines a line that forms a figure similar to the edge 114 of the display surface 112 about the center of the display surface 112 as a first line 310. FIG. 1 is an example where the conversion unit 120 defines a figure similar to the rectangular shape of the edge 114 about the center of the display surface 112, which is the intersection point of the two chained lines, as the first line 310 in response to input of the first operation point 210.

The conversion unit 120 enlarges or reduces the similar figure about the center of the display surface 112 at a predetermined ratio with respect to the distance by which the user moves the touch point from the first operation point 210 on the touchscreen 110 after the user inputs the first operation point 210 with a touch. For instance, when the first operation point 210 is input at an approximately center of the edge 114, the conversion unit 120 displays the similar figure formed by the first line 310 at a size approximately halfway between the minimum and maximum sizes.

When the first operation point 210 is input to the left of the center of the edge 114, the conversion unit 120 may display the similar figure formed by the first line 310 at a larger size as the distance from the center is greater. In this case, when the first operation point 210 is input to the right of the center of the edge 114, i.e., opposite to the operation point 212, the conversion unit 120 may display the similar figure formed by the first line 310 at a smaller size as the distance from the center is greater. For example, the conversion unit 120 may display the similar figure formed by the first line 310 at a size proportional to the distance between the first operation point 210 and the center of the edge 114.

Also, when the user inputs the first operation point 210 with a touch and then moves the touch point to the operation point 212 on the touchscreen 110, the conversion unit 120 enlarges the rectangular shape drawn by the first line 310 with its center fixed as indicated by the arrows in the figure, for example. If the touch point is moved to the right on the touchscreen 110, that is, opposite to the operation point 212, the conversion unit 120 may reduce the rectangular shape drawn by the first line 310 with its center fixed.

The conversion unit 120 also defines a point on the first line 310 that is in a predetermined positional relationship as the operation point to be operated 312 based on a second operation point 220 inputted by the user. For example, the conversion unit 120 determines the operation point to be operated 312 such that the positional relationship between the second operation point 220 and the rectangular shape of the edge 114 is approximately similar to the positional relationship between the operation point to be operated 312 and the shape of the first line 310.

Also, the conversion unit 120 shifts the operation point to be operated 312 about the center of the display surface 112 at a predetermined ratio with respect to the distance by which the user moves the touch point from the second operation point 220 on the touchscreen 110 after the user inputs the second operation point 220 with a touch. For example, the conversion unit 120 shifts the operation point to be operated 312 in the direction of the arrow such that the distance by which the touch point was moved from the second operation point 220 to operation point 222 relative to the rectangular shape of the edge 114 is approximately similar to the distance by which the operation point to be operated 312 is shifted relative to the shape of the first line 310.

Alternatively, the conversion unit 120 may shift the operation point to be operated 312 along the first line 310 in the direction of the arrow more than the distance by which the touch point is moved from the second operation point 220 to the operation point 222. For example, when the user moves the touch point from one end to the other end of a side of the edge 114, the conversion unit 120 shifts the operation point to be operated 312 such that the operation point 312 makes almost a circuit of the rectangular shape formed by the first line 310.

Thus, the conversion unit 120 converts the operation points inputted by the user to the corresponding operation point to be operated 312. In response to the user determining the operation point to be operated 312, the conversion unit 120 sends position information for the determined operation point to be operated 312 to the processing unit 130.

The processing unit 130 receives the position information for the operation point to be operated 312 sent by the conversion unit 120 and performs processing assuming that the corresponding position of the content displayed on the display surface 112 was inputted by touching. In the illustrated example, the processing unit 130 receives the position information for the operation point to be operated 312 determined by the user, and processes the execution of a control 116e assuming that the control 116e, displayed at the corresponding position in the content displayed on the display surface 112, has been clicked.

The processing unit 130 also runs a predetermined program and displays content for the program on the display surface 112. The processing unit 130 may display content from a network, e.g., the Internet, on the display surface 112 in accordance with the execution of the predetermined program or the user's direction.

Figure 2:
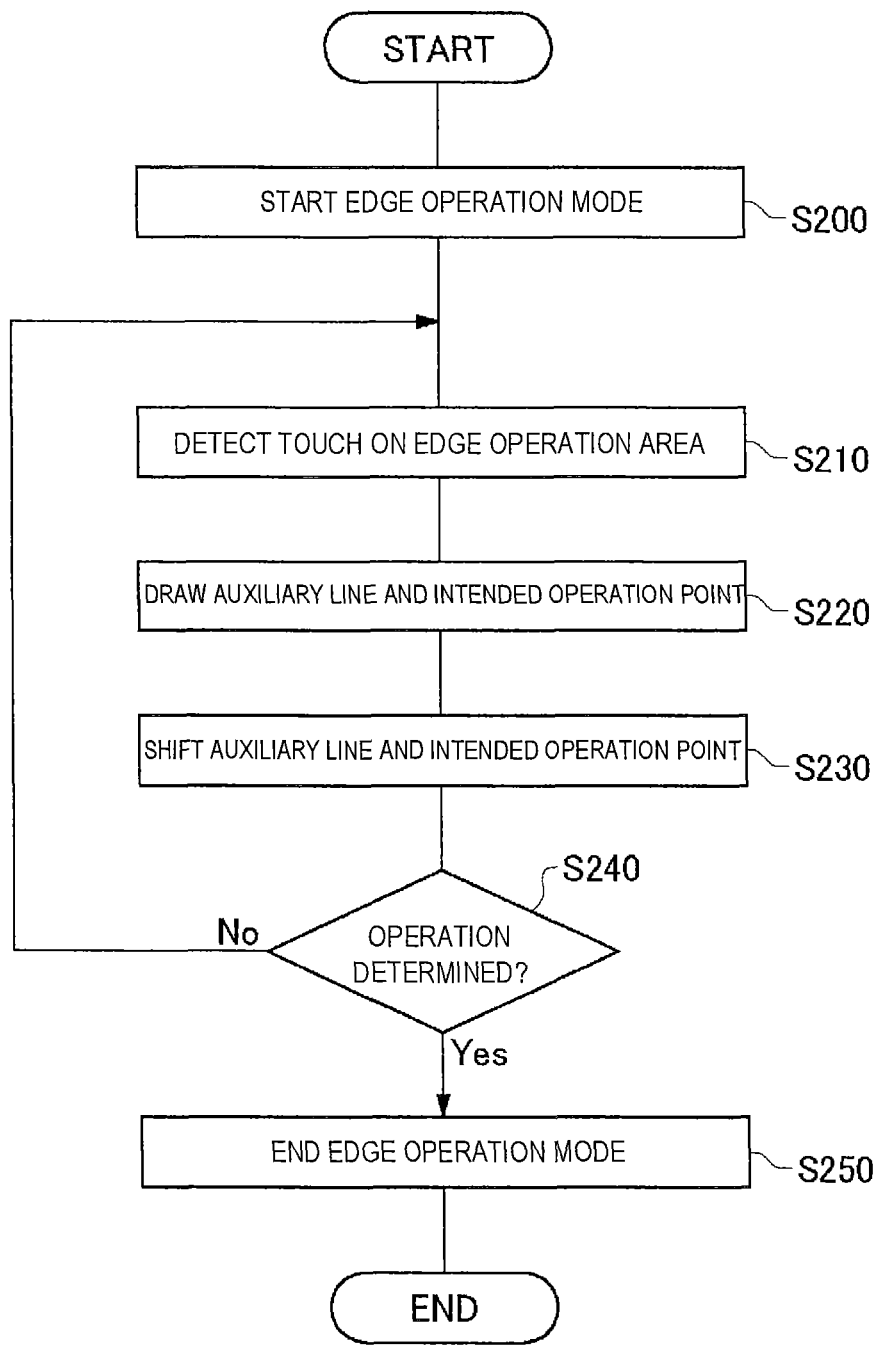
FIG. 2 is a flowchart of a method for operating the display device in accordance with an embodiment of the present invention.

FIG. 2 is a flowchart of a method for operating the display device 100 (FIG. 1) in accordance with an embodiment of the present embodiment. Referring to FIG. 2, in conjunction with FIG. 1, if controls 116 are included in the content displayed on the display surface 112, the display device 100 starts an edge operation mode to wait for a user input (S200). Alternatively, the display device 100 may start the edge operation mode upon detecting a user action, such as touching the touchscreen 110, moving the display device 100 to give it an acceleration, or tilting the display device 100. In this case, the display device 100 may further include a detection unit for detecting the user's operation input.

The display device 100 then detects a touch by the user in an operation area on the edge 114 (S210). The conversion unit 120 converts the touch to the corresponding operation point to be operated 312 based on the detected first operation point 210 and second operation point 220 inputted by the user.

Next, in response to the user's input of the operation points, the display surface 112 displays the first line 310 and the operation point to be operated 312 corresponding to the input operation points (S220). Specifically, the display surface 112 draws the first line 310 as an auxiliary line for the user's operation input and the operation point to be operated 312 as an intended operation point. In this case, the conversion unit 120 may send the position information for the first line 310 and operation point to be operated 312 to the touchscreen 110, or instead, to the touchscreen 110 via the processing unit 130.

Then, the conversion unit 120 shifts the corresponding first line 310 and operation point to be operated 312 based on the movement from the first operation point 210 to the operation point 212 and/or the movement from the second operation point 220 to the operation point 222 (S230). The conversion unit 120 may shift the corresponding first line 310 and operation point to be operated 312 in accordance with the positions traversed before the user determined the operation, without depending on the order and number of movements of the first operation point 210 and the second operation point 220.

Along with these shifts, the display surface 112 may update the drawing of the first line 310 and the operation point to be operated 312.

The conversion unit 120 then repeats steps S210 through S230 until the user determines the operation point to be operated 312 (S240). The conversion unit 120 detects a determination of the operation point to be operated 312 when the user inputs a predetermined operation. For example, the conversion unit 120 detects the determination of the operation point to be operated 312 by detecting an action by the user, such as ceasing touching the first operation point 210 and the second operation point 220, inputting a third operation point, moving the display device 100 to give it an acceleration, or tilting the display device 100.

The conversion unit 120 may also cancel the input of the operation point to be operated 312 when the user inputs a predetermined operation that is different from the operation for determining the operation point to be operated 312. For example, the conversion unit 120 may cancel the input of the operation point to be operated 312 when detecting an action by the user, such as ceasing touching the first operation point 210 and the second operation point 220, inputting a third operation point, moving the display device 100 to give it an acceleration, or tilting the display device 100. In this case, the display device 100 returns to step S210, where the user is prompted to input the operation point to be operated 312 again.

Upon detecting the determination of the operation point to be operated 312, the conversion unit 120 sends the position information for the determined operation point to be operated 312 to the processing unit 130, and ends the edge operation mode (S250). If controls 116 displayed on the display surface 112 wait for multiple user inputs, the processing unit 130 may start the edge operation mode while storing or keeping the received position information for the operation point to be operated 312.

The display device 100 according to the above-described embodiment allows the user to manipulate the controls 116 displayed in the center area of the display surface 112 except the edge 114 by the user operating the edge 114 of the display surface 112 on the touchscreen 110. Thus, even when the display surface 112 of the display device 100 is small relative to the user's fingers, for example, the user can operate the controls 116 while seeing the center area of the display surface 112 except the edge 114.

In addition, even when the controls 116 displayed on the display surface 112 are small relative to the user's fingers, for example, the user can easily manipulate a control 116 he/she wants to input. Likewise, even when the display surface 112 of the display device 100 is large relative to the user's fingers and the controls 116 are located over a wide area, for example, the user can easily manipulate a control 116 he/she wants to input by operating the edge 114 of the display surface 112.

Figure 3:
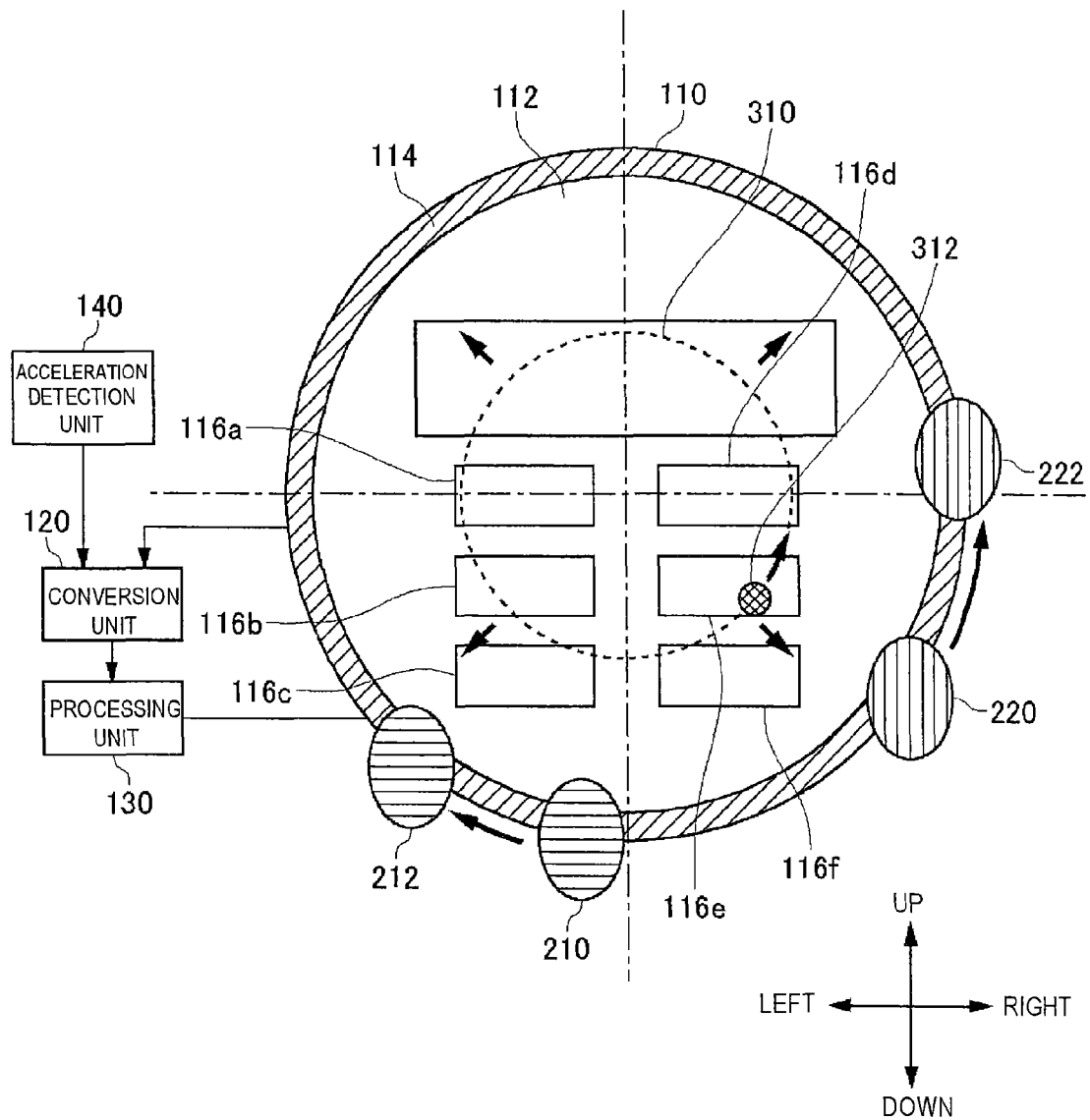
FIG. 3 illustrates a first variation of the display device in accordance with an embodiment of the present invention.

FIG. 3 shows a first variation of the display device 100 according to an embodiment of the present embodiment. In relation to the display device 100 in this variation, actions similar to those of the display device 100 of the present embodiment shown in FIG. 1 are denoted with the same reference numerals and their descriptions are omitted. The display surface 112 in this variation has an elliptical or circular shape in which the edge 114 of the display portion includes a curve. Alternatively, the display surface 112 may be oval. The display device 100 in this variation may be incorporated into a watch, for example.

The display device 100 in this variation includes an operation unit and an input unit. The operation unit, for operation by the user, is provided in the edge 114 of the display surface 112. FIG. 3 is an example where the edge 114 functions as the operation unit.

Alternatively, the operation unit may be provided outside the display surface 112. In this case, the operation unit may be a ring or a shape forming part of a ring concentric with the display surface 112. The operation unit may further include a touchscreen for the user to input operation points. Alternatively, the operation unit may be a dial, winder, lever or the like having a movable part for physical operation by the user. The operation unit desirably has a rotary movable part.

The input unit inputs a point within the display surface 112 as the operation point to be operated 312 in response to the user's operation of the operation unit. FIG. 3 shows an example where the conversion unit 120 functions as the input unit. That is, the conversion unit 120 defines a point that is in a predetermined positional relationship with an operation point actually inputted by the user as the operation point to be operated 312. Also in this variation, the user operates the controls 116 on the display surface 112 through an action such as bringing a finger into contact with or moving the finger away from the edge 114 of the touchscreen 110. Also in this variation, the conversion unit 120 defines a point within the display surface 112 as the operation point to be operated 312 based on the operation points 210, 212, 220, and 222 actually manipulated by the user.

In response to input of the first operation point 210, the conversion unit 120 defines a line that forms a figure similar to the substantially circular shape of the edge 114 about the center of the display surface 112, which is the intersection point of the two chain lines, as the first line 310. When the user inputs the first operation point 210 with a touch and then moves the touch point to the operation point 212 clockwise on the touchscreen 110, the conversion unit 120 enlarges the shape of the first line 310 with its center fixed as indicated by the arrows in the figure, for example. When the user moves the touch point counterclockwise on the touchscreen 110, that is, in the opposite direction to the operation point 212, the conversion unit 120 may reduce the shape of the first line 310 with its center fixed.

In response to the user's input of the second operation point 220, the conversion unit 120 determines the position of the operation point to be operated 312 on the first line 310. For example, the conversion unit 120 determines the position so that the positional relationship between the second operation point 220 and the substantially circular shape of the edge 114 is approximately similar to the positional relationship between the operation point to be operated 312 and the shape of the first line 310. The conversion unit 120 also shifts the operation point to be operated 312 so that the distance of movement from the second operation point 220 to the operation point 222 relative to the substantially circular shape of the edge 114 is approximately similar to the distance by which the operation point to be operated 312 is shifted relative to the shape of the first line 310, for example.

Alternatively, the conversion unit 120 may shift the operation point to be operated 312 along the first line 310 counterclockwise as indicated by the arrow more than the distance of movement from the second operation point 220 to the operation point 222. In this manner, the conversion unit 120 converts operation points inputted by the user into the corresponding operation point to be operated 312.

The display device 100 in the above-described variation allows the user to manipulate controls 116 displayed in the center area of the display surface 112 except the edge 114 by operating the edge 114 of the display surface 112 on the touchscreen 110. In addition, even when the operation unit is provided outside the display surface 112, the user can similarly manipulate the controls 116 on the display surface 112 by operating the operation unit.

Figure 4:
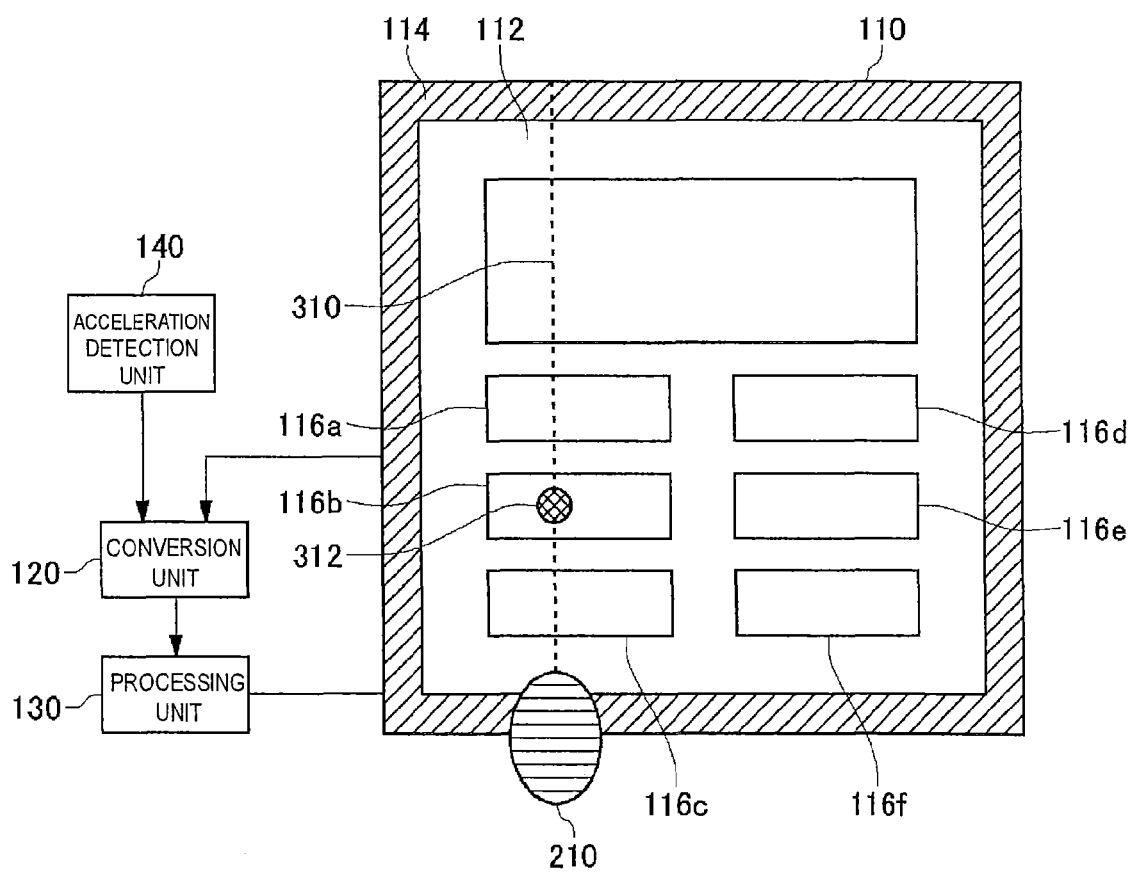
FIG. 4 illustrates a second variation of the display device in accordance with an embodiment of the present invention.

FIG. 4 shows a second variation of the display device 100 in accordance with an embodiment of the present invention. In relation to the display device 100 in this variation, actions similar to those of the display device 100 of the present embodiment shown in FIG. 1 are denoted with the same reference numerals and their descriptions are omitted.

The conversion unit 120 in this variation defines a point within the display surface 112 positioned on the first line 310 that passes through the first operation point 210 as the operation point to be operated 312 in response to the user's input of the first operation point 210. For example, when the first operation point 210 is inputted, the conversion unit 120 defines a line that passes through the first operation point 210 and extends in the vertical direction of the display surface 112, i.e., upward in the figure, as the first line 310.

The conversion unit 120 defines a point at a predetermined position on the first line 310 as the operation point to be operated 312. For example, the conversion unit 120 defines the midpoint of the first line 310 as the operation point to be operated 312. In other words, in this variation, the first operation point 210 inputted by the user with a touch represents determination of the horizontal position of the operation point to be operated 312 in the display surface 112.

The conversion unit 120 shifts the position of the operation point to be operated 312 on the display surface in accordance with the direction and distance by which the user moves the touch point from the first operation point 210 on the touchscreen 110 after touching and inputting the first operation point 210. For example, when the user inputs the first operation point 210 with a touch and then moves the touch point in the horizontal direction of the display surface 112 on the touchscreen 110, the conversion unit 120 shifts the first line 310 and the operation point to be operated 312 also horizontally for the same distance as the distance by which the touch point was moved.

The conversion unit 120 defines a point on the first line 310 that is in a predetermined positional relationship with the length of a segment in which the touch point is moved in parallel with the first line 310 within the total distance of movement of the touch point from the first operation point 210 by the user, as the operation point to be operated 312. For example, when the user inputs the first operation point 210 with a touch and then moves the touch point in the vertical direction of the display surface 112 on the touchscreen 110, the conversion unit 120 vertically shifts the operation point to be operated 312 on the first line 310.

The conversion unit 120 may shift the operation point to be operated 312 vertically for a distance greater than the distance by which the user moves the touch point. The display device 100 thus can adjust the vertical position of the operation point to be operated 312 on the display surface 112. Thereby, the display device 100 allows the user to manipulate the controls 116 displayed on the display surface 112.

Alternatively, the conversion unit 120 may display an intended operation point reciprocating on the first line 310 within the display surface 112 after the user inputs the first operation point 210 with a touch and define the position of the intended operation point at the time the user has ceased touching as the operation point to be operated 312. The conversion unit 120 may reciprocate the intended operation point on the first line 310 at a constant speed.

For example, when the user wants to operate a control 116b, the user selects and touches the first operation point 210 so that the first line 310 passes through the control 116b. If the first line 310 does not pass through the control 116b, the user can adjust the position of the first line 310 by either re-inputting the first operation point 210 or moving the touch from the first operation point 210 in the horizontal direction of the display surface 112 on the touchscreen 110.

Thereby, the conversion unit 120 displays a reciprocating intended operation point on the first line 310 that passes through the first operation point 210 and the control 116b in the display surface 112. When the intended operation point reaches the control 116b, the user ceases touching the first operation point 210 to thereby stop the intended operation point on the control 116b and determine the position of the operation point to be operated 312. The user can then manipulate the control 116b.

Alternatively, the display device 100 may further include an acceleration detection unit 140 to detect an acceleration generated on the display device 100 by the user moving the display device 100, and determine the vertical position of the operation point to be operated 312 in the display surface 112 in accordance with the result of detection by the acceleration detection unit 140. The acceleration detection unit 140 may be a multi-axis acceleration detector for detecting accelerations in multiple directions.

The acceleration detection unit 140 detects the acceleration given by the user to the display device 100 after inputting the first operation point 210, and the conversion unit 120 defines a point on the first line 310 that is in a predetermined positional relationship with respect to the magnitude of the detected acceleration as the operation point to be operated 312. For example, if the user inputs the first operation point 210 and then tilts the display device 100, the acceleration detection unit 140 detects the magnitude of the inclination of the display device 100 and/or acceleration generated by the force of tilt, and the position of the operation point to be operated 312 is determined according to the magnitude.

As an example, suppose that the user is holding the display device 100 in his/her hand so that the user faces the display surface 112 and operating the device looking at the display surface 112 which is displayed as illustrated in FIG. 4 from the front. In this situation, when the user tilts the display device 100 toward him/herself, the conversion unit 120 may shift the operation point to be operated 312 so that the position of the operation point to be operated 312 approaches the first operation point 210, i.e., downward in the figure.

When the user tilts the display device 100 in the opposite direction, that is, away from the user, the conversion unit 120 may shift the operation point to be operated 312 so that the position of the operation point to be operated 312 moves away from the first operation point 210, i.e., upward in the figure. Alternatively, the acceleration detection unit 140 may detect the user moving the display device 100 horizontally or vertically, and the conversion unit 120 may determine the position of the operation point to be operated 312 in accordance with the amount of movement.

The display device 100 according to the above-described variation allows the user to manipulate controls 116 displayed in the center area of the display surface 112 except the edge 114 by operating the edge 114 of the display surface 112 by touching it on the touchscreen 110. Although the foregoing variation mentioned that the user operates the lower edge 114 of the display surface 112 by touching it, the user may touch and operate any of the other sides of the display surface 112 instead.

For example, if the user inputs the first operation point 210 on the upper edge 114, a line that passes through the first operation point 210 and extends vertically downward in the display surface 112 is defined as the first line 310. Also in this case, the user's input of the first operation point 210 represents the determination of the horizontal position of the operation point to be operated 312.

Alternatively, when the user inputs the first operation point 210 on either the right or left edge 114, a line that passes through the first operation point 210 and horizontally extends in the display surface 112 may be defined as the first line 310. In this case, the user's input of the first operation point 210 represents the determination of the vertical position of the operation point to be operated 312.

Figure 5:
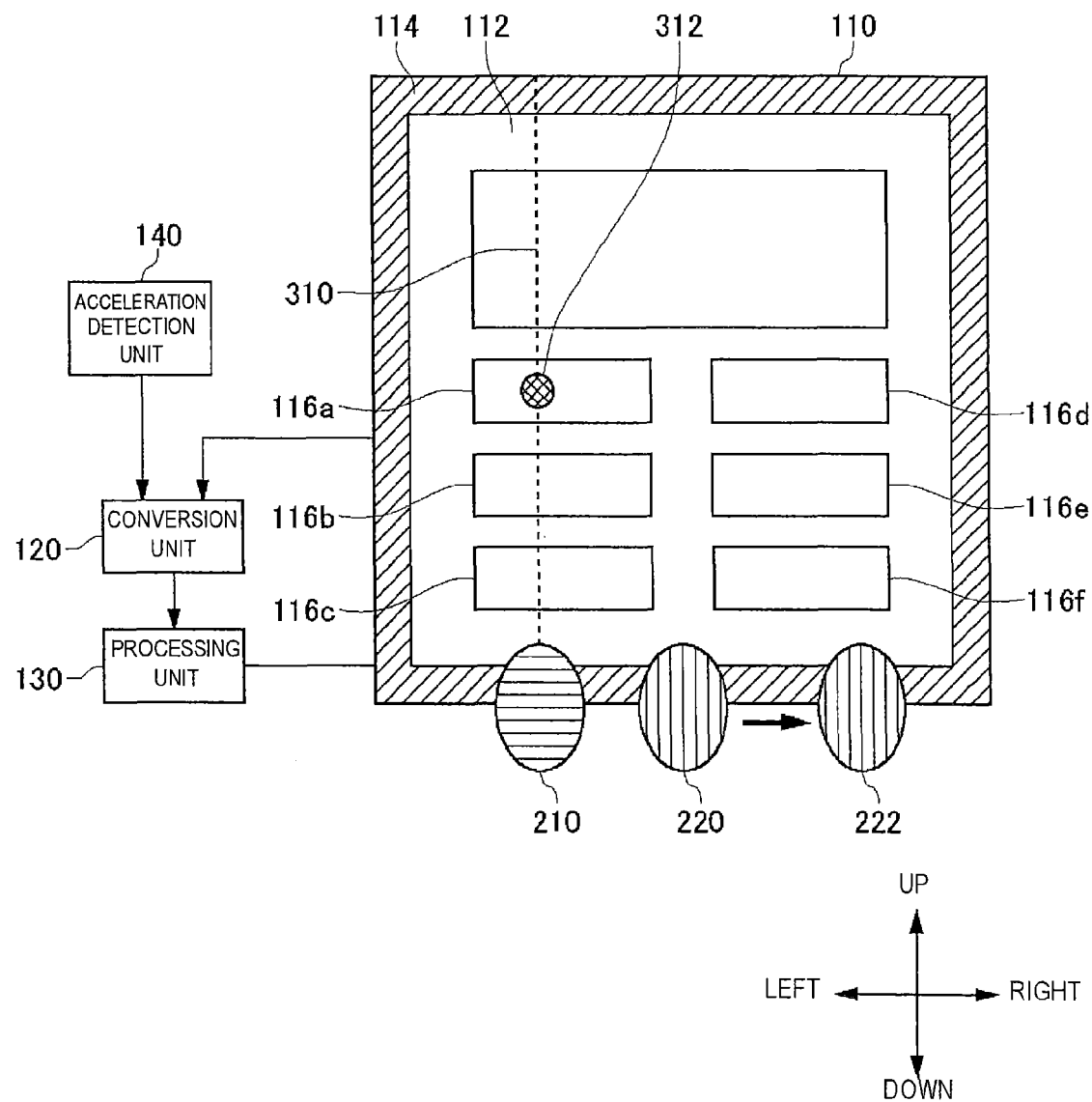
FIG. 5 illustrates a third variation of the display device in accordance with an embodiment of the present invention.

FIG. 5 shows a third variation of the display device 100 in accordance with an embodiment of the present invention. In relation to the display device 100 in this variation, actions similar to those of the display device 100 of the present embodiment shown in FIGS. 1 and 4 are denoted with the same reference numerals and their descriptions are omitted.

The conversion unit 120 defines a point on the first line 310 that is in a predetermined positional relationship with the second operation point 220 inputted by the user as the operation point to be operated 312. The user inputs the first operation point 210 and then inputs the second operation point 220. FIG. 5 illustrates an example where the user operates the lower edge 114 of the display surface 112 by touching it to determine the horizontal position of the operation point to be operated 312 and then inputs the second operation point 220 to determine the vertical position of the operation point to be operated 312.

For example, in response to input of the first operation point 210, the conversion unit 120 defines a line that passes through the first operation point 210 and extends in the vertical direction of the display surface 112 as the first line 310. The conversion unit 120 defines a point at a predetermined position on the first line 310 as the operation point to be operated 312.

The conversion unit 120 then determines the vertical position of the operation point to be operated 312 according to the input position of the second operation point 220. For example, when the user inputs the second operation point 220 at an approximate center of the lower edge 114 of the display surface 112, the conversion unit 120 defines an approximate midpoint of the first line 310 in the display surface 112 as the vertical position of the operation point to be operated 312.

When the user inputs the second operation point 220 at a position apart from the center of the edge 114, a position separated from the midpoint of the first line 310 by approximately the distance between the point 220 and the center may be defined as the vertical position of the operation point to be operated 312. Alternatively, the conversion unit 120 may define the distance between the second operation point 220 and the center of the edge 114 multiplied by a predetermined constant as the distance between the operation point to be operated 312 and the midpoint of the first line 310. By way of example, when the user inputs the second operation point 220 at a point positioned to the right of the center of the edge 114, the conversion unit 120 may determine the vertical position of the operation point to be operated 312 at a position away from and above the midpoint.

The conversion unit 120 also defines the operation point to be operated 312 on the first line 310 that is in a predetermined positional relationship with the distance by which the user moves the touch point from the second operation point 220 on the touchscreen 110 after the user inputs the second operation point 220 with a touch. For example, when the user moves the second operation point 220 to the right, that is, in the direction away from the first operation point 210, up to the operation point 222, the conversion unit 120 shifts the operation point to be operated 312 upward, that is, in the direction away from the first operation point 210.

The conversion unit 120 may shift the operation point to be operated 312 for the same distance as the distance of movement of the second operation point 220. Alternatively, the conversion unit 120 may shift the operation point to be operated 312 for the distance of movement of the second operation point 220 multiplied by a predetermined constant. The display device 100 according to the above-described variation allows the user to manipulate the controls 116 displayed in the center area of the display surface 112 except the edge 114 by operating the edge 114 of the display surface 112 on the touchscreen 110.

Figure 6:
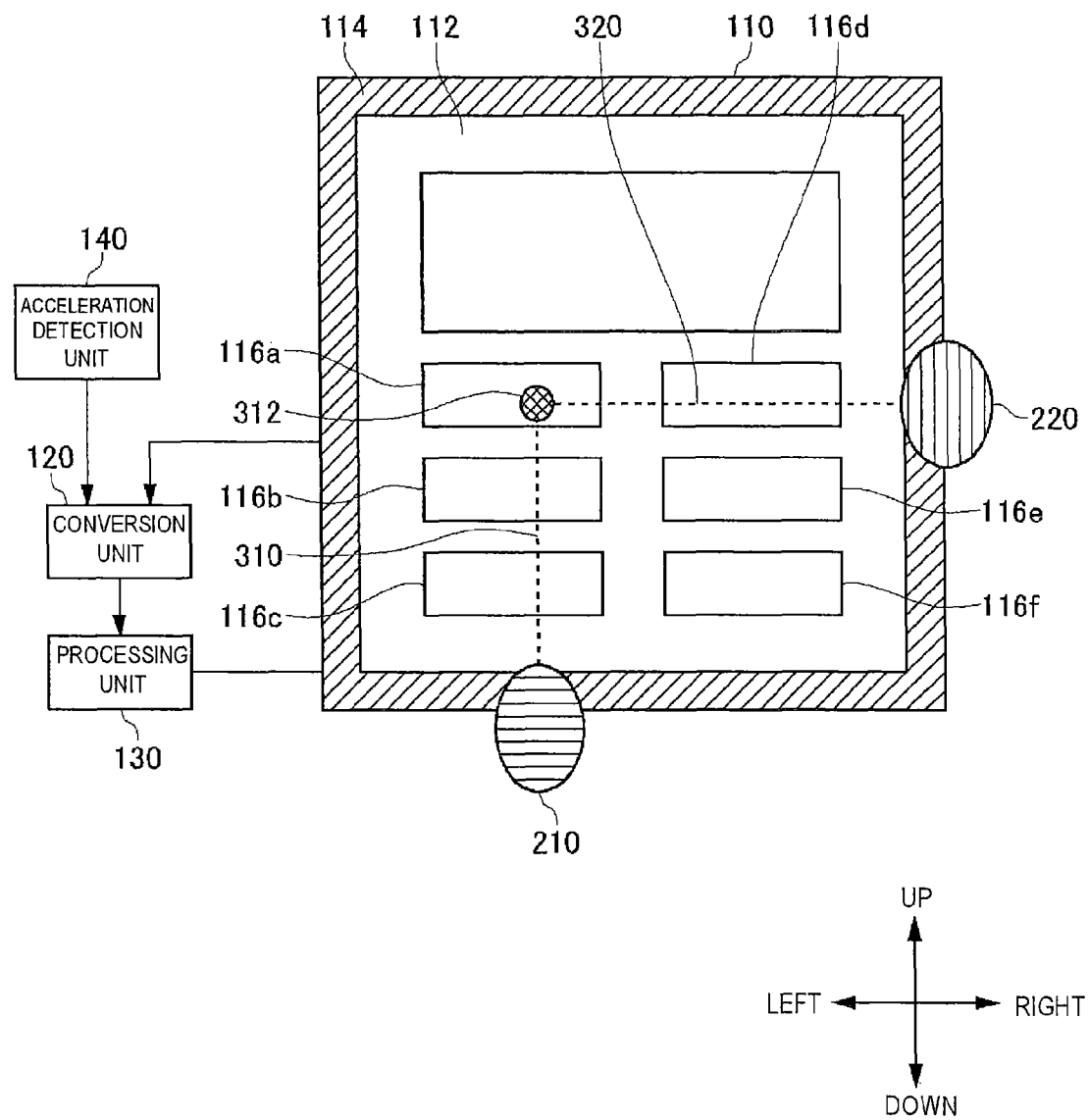
FIG. 6 illustrates a fourth variation of the display device in accordance with an embodiment of the present invention.

FIG. 6 shows a fourth variation of the display device 100 in accordance with an embodiment of the present invention. In relation to the display device 100 in this variation, actions similar to those of the display device 100 of the present embodiment shown in FIGS. 1, 4 and 5 are denoted with the same reference numerals and their descriptions are omitted. FIG. 6 illustrates an example where the user touches and operates an area of the display surface 112 except the area in which the controls 116 are displayed in order to manipulate a control 116a.

The conversion unit 120 defines a straight line passing through the second operation point 220 in the display surface 112 as a second line 320, and defines the intersection point of the first line 310 and the second line 320 in the display surface 112 as the operation point to be operated 312. For example, in response to input of the first operation point 210, the conversion unit 120 defines a line passing through the first operation point 210 and extending in the vertical direction of the display surface 112 as the first line 310. In response to input of the second operation point 220, the conversion unit 120 defines a line passing through the second operation point 220 and extending in the horizontal direction of the display surface 112 as the second line 320.

The conversion unit 120 defines the intersection point of the first line 310 and the second line 320 as the operation point to be operated 312. That is, the conversion unit 120 determines the horizontal position of the operation point to be operated 312 based on the first operation point 210 and the vertical position of the operation point to be operated 312 based on the second operation point 220. The user may change the order of inputting the first operation point 210 and the second operation point 220. Alternatively, the user may input the first operation point 210 and the second operation point 220 almost simultaneously.

The user may also input the first operation point 210 and the second operation point 220 by touching them and then move the touch points to adjust the position of the operation point to be operated 312. The display device 100 according to the above-described variation allows the user to manipulate controls 116 displayed in the center area of the display surface 112 except the edge 114 by operating the edge 114 of the display surface 112 on the touchscreen 110.

Figure 7:
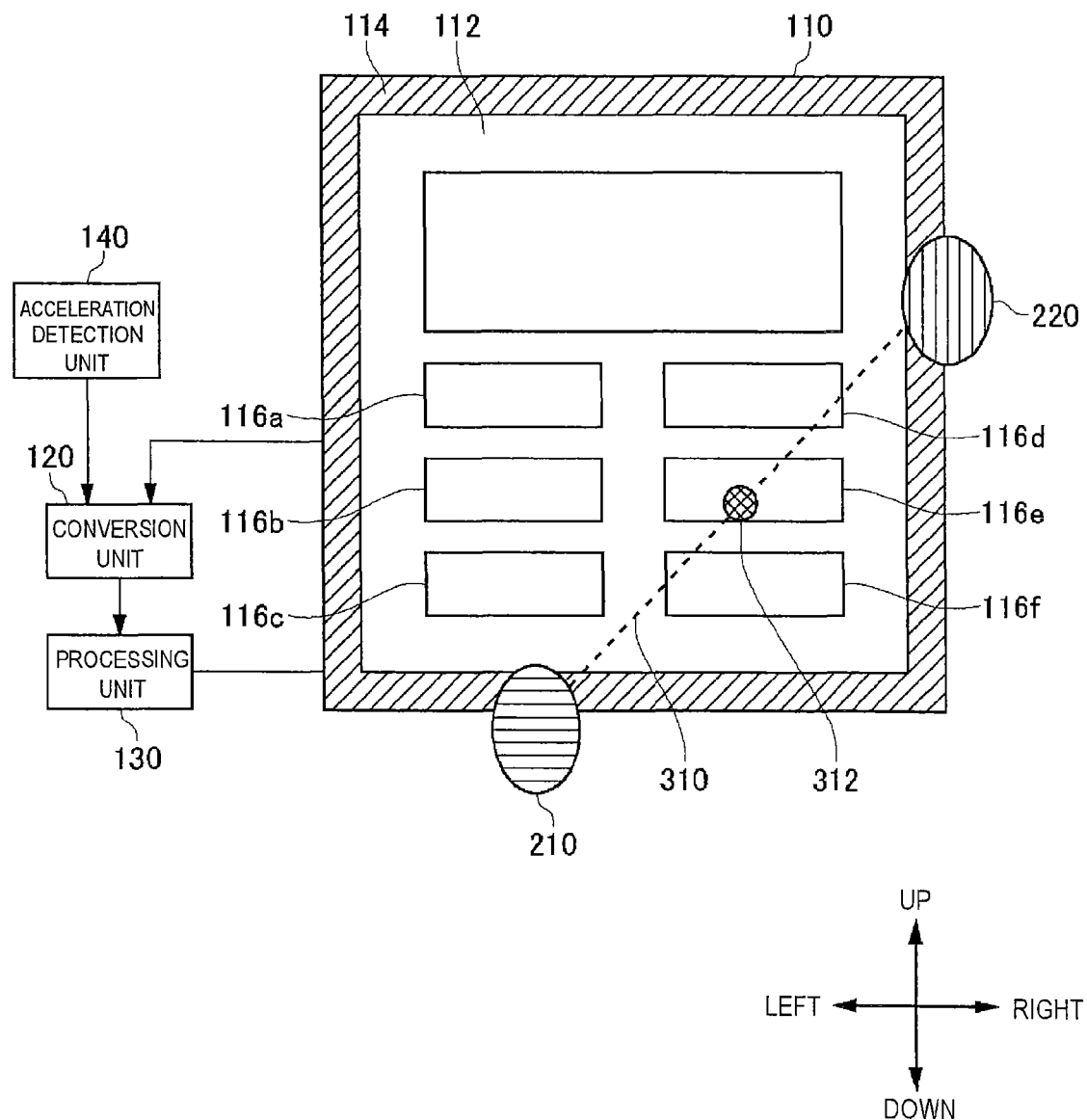
FIG. 7 illustrates a fifth variation of the display device in accordance with an embodiment of the present invention.

FIG. 7 shows a fifth variation of the display device 100 in accordance with an embodiment of the present invention. In relation to the display device 100 in this variation, actions similar to those of the display device 100 of the present embodiment shown in FIGS. 1, 4 and 5 are denoted with the same reference numerals and their descriptions are omitted. FIG. 7 illustrates an example where the user touches and operates the edge 114 of the display surface 112 in order to manipulate a control 116e.

The conversion unit 120 defines a straight line that passes through the first operation point 210 and the second operation point 220 in the display surface 112 as the first line 310, and defines a point on the first line 310 that is in a predetermined positional relationship as the operation point to be operated 312. For example, in response to input of the first operation point 210 and the second operation point 220, the conversion unit 120 defines a line in the display surface 112 that passes through the first operation point 210 and the second operation point 220 as the first line 310.

The conversion unit 120 may define the midpoint of the first line 310 as the operation point to be operated 312. Alternatively, the conversion unit 120 may define a point that divides the first line 310 at a predetermined ratio as the operation point to be operated 312.

The user may also input the first operation point 210 and the second operation point 220 by touching them and then move the touch points to adjust the position of the operation point to be operated 312. The display device 100 in the above-described variation allows the user to manipulate controls 116 displayed in the center area of the display surface 112 except the edge 114 by operating the edge 114 of the display surface 112 on the touchscreen 110.

Figure 8:
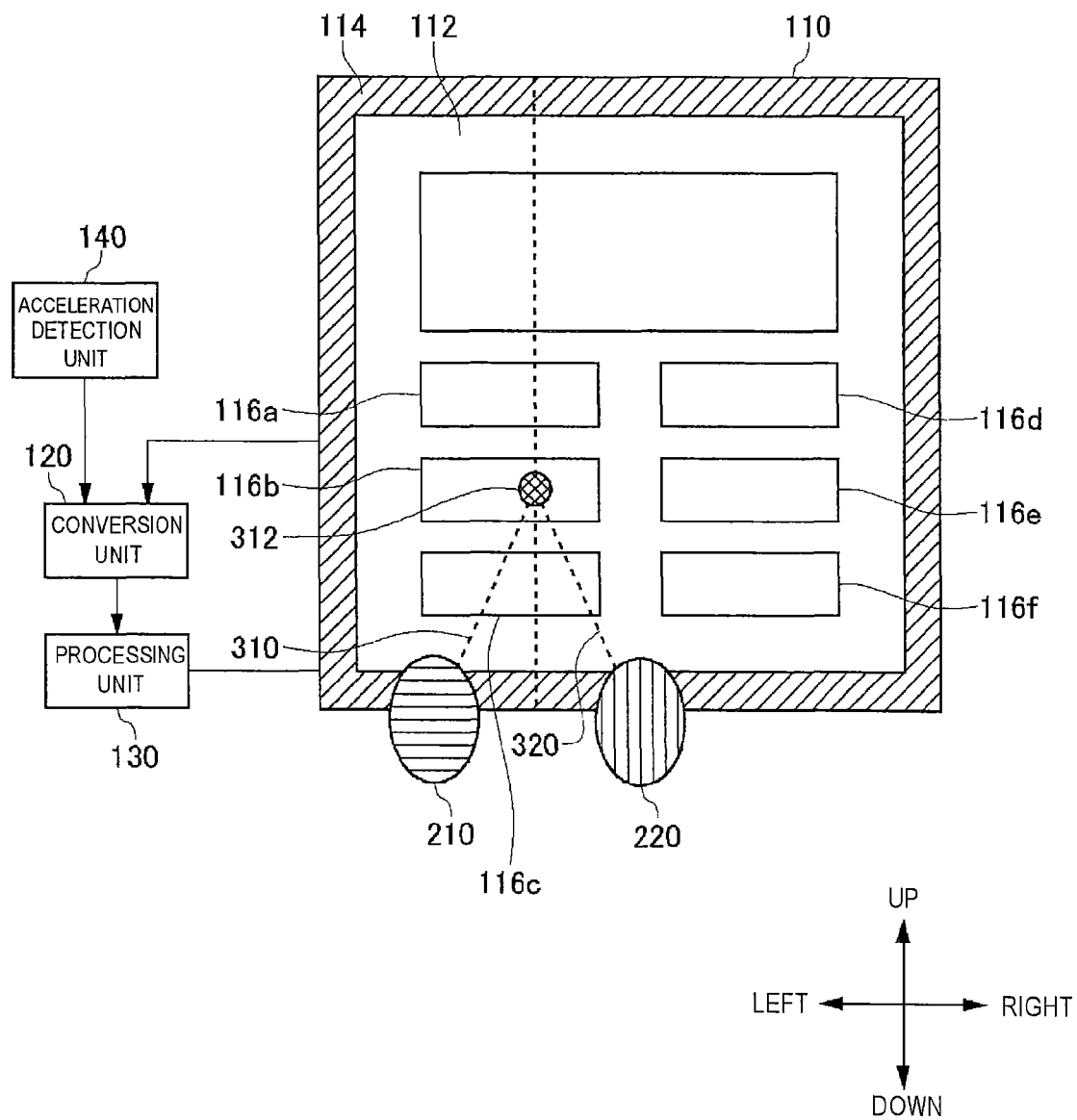
FIG. 8 illustrates a sixth variation of the display device in accordance with an embodiment of the present invention.

FIG. 8 shows a sixth variation of the display device 100 in accordance with an embodiment of the present invention. In relation to the display device 100 in this variation, actions similar to those of the display device 100 of the present embodiment shown in FIGS. 1, 4 and 5 are denoted with the same reference numerals and their descriptions are omitted. FIG. 8 illustrates an example where the user touches and operates the edge 114 of the display surface 112 in order to manipulate a control 116b.

The conversion unit 120 defines the two equal sides of an isosceles triangle whose base is the straight line connecting the first operation point 210 and the second operation point 220 in the display surface 112 as the first line 310 and the second line 320 respectively, and defines the intersection point of the first line 310 and the second line 320 as the operation point to be operated 312. The conversion unit 120 may determine the height of the isosceles triangle so that the area of the triangle is equal to a predetermined value in accordance with the positions of the first operation point 210 and the second operation point 220.

Alternatively, the conversion unit 120 may determine the height of the isosceles triangle so that the shape of the isosceles triangle is similar to a predetermined figure in accordance with the positions of the first operation point 210 and the second operation point 220. Thus, the conversion unit 120 can determine the position of the operation point to be operated 312 on the bisector line within the display surface 112 of the line segment connecting the first operation point 210 and the second operation point 220, in accordance with the spacing between the first operation point 210 and the second operation point 220 inputted by the user.

The user may input the first operation point 210 and the second operation point 220 by touching them and then move the touch points to adjust the position of the operation point to be operated 312. The display device 100 in the above-described variation allows the user to manipulate controls 116 displayed in the center area of the display surface 112 except the edge 114 by operating the edge 114 of the display surface 112 on the touchscreen 110.

Although the foregoing fourth to sixth variations of the display device 100 are examples where the display surface 112 has a rectangular shape, the display surface 112 may instead be circular, elliptical, oval, or polygonal.

Figure 9:
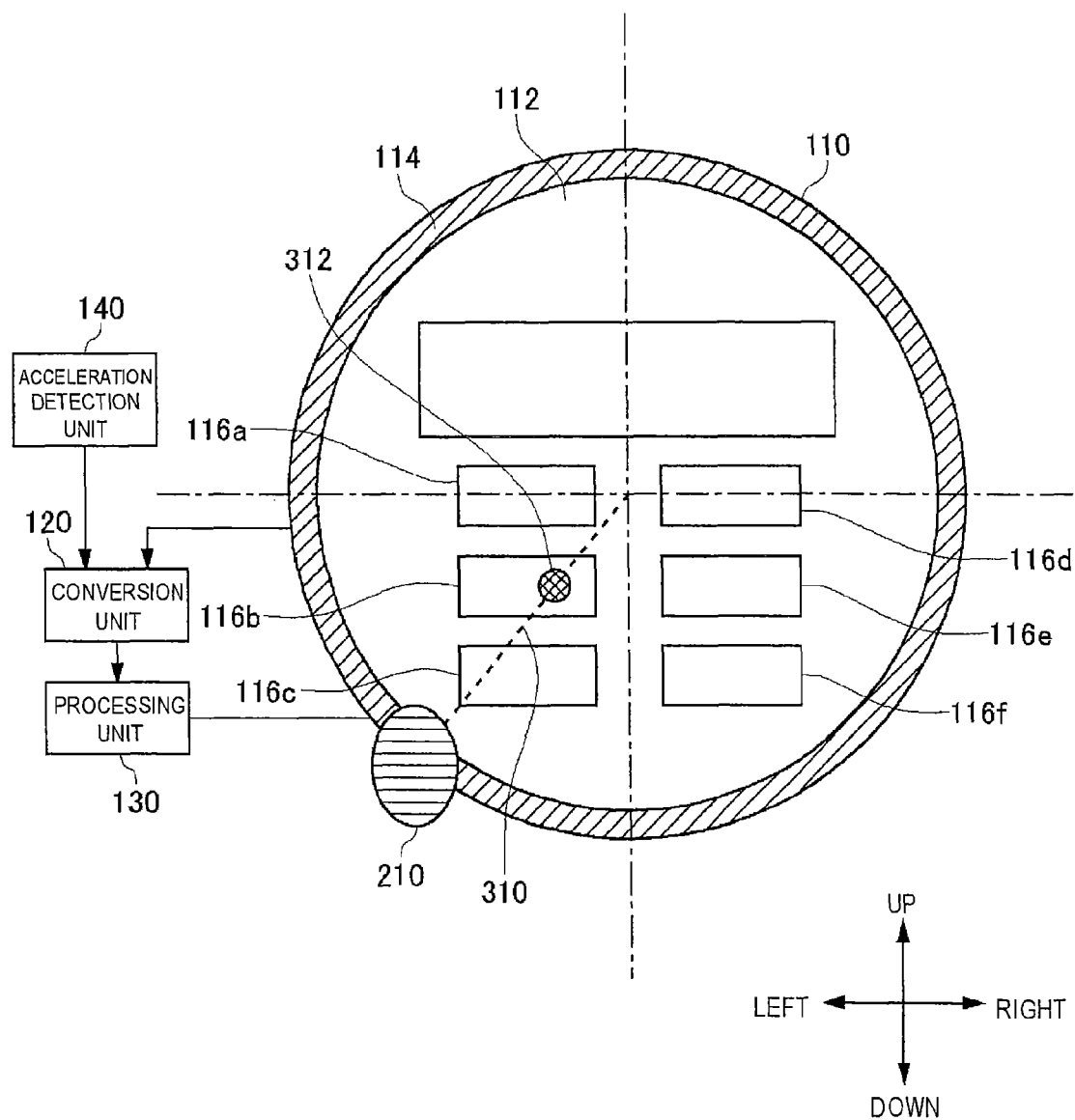
FIG. 9 illustrates a seventh variation of the display device in accordance with an embodiment of the present invention.

FIG. 9 shows a seventh variation of the display device 100 in accordance with an embodiment of the present invention. In relation to the display device 100 in this variation, actions similar to those of the display device 100 of the present embodiment shown in FIGS. 3, 4 and 5 are denoted with the same reference numerals and their descriptions are omitted. FIG. 9 illustrates an example where the user touches and operates the edge 114 of the display surface 112 in order to manipulate the control 116*b*.

In response to the user's input of the first operation point 210, the conversion unit 120 defines a straight line in the display surface 112 that passes through the first operation point 210 and the center of the display surface 112 as the first line 310. FIG. 9 shows an example where the conversion unit 120 defines a line that connects the first operation point 210 and the center of the display surface 112, which is the intersection point of the two chain lines, and that represents the radius of the display surface 112 as the first line 310 in response to input of the first operation point 210. Alternatively, the conversion unit 120 may define the line that passes through the first operation point 210 and the center of the display surface 112 and that represents the diameter of the display surface 112 as the first line 310. The conversion unit 120 may also define a point at a predetermined position on the first line 310 as the operation point to be operated 312.

After the user inputs the first operation point 210 with a touch, the conversion unit 120 rotates the first line 310 about the center of the display surface 112 and stops the rotation of the first line 310 when the user has ceased touching. The conversion unit 120 may display an intended operation point reciprocating on the first line 310 upon stopping the rotation of the first line 310. In this case, the conversion unit 120 stops the reciprocation of the intended operation point when the user performs another touch input, and defines the stop position of the intended operation point as the operation point to be operated 312.

As described, the display device 100 in the foregoing variation allows the user to manipulate controls 116 displayed in the center area of the display surface 112 except the edge 114 by operating the edge 114 of the display surface 112 on the touchscreen 110.

The foregoing variation showed that the conversion unit 120 establishes the first line 310 based on the first operation point 210 inputted by the user with a touch. The second variation of the display device 100 according to the present embodiment also establishes the first line 310 based on the first operation point 210. Accordingly, the conversion unit 120 of the seventh variation may adopt a similar method to the second variation for establishment of the operation point to be operated 312 on the first line 310 after establishing the first line 310.

Specifically, the conversion unit 120 may shift the position of the operation point to be operated 312 in the display surface in accordance with the direction and distance of movement of the touch point from the first operation point 210 on the touchscreen 110 after the first operation point 210 is inputted by the user with a touch. For example, when the user inputs the first operation point 210 with a touch and then moves the touch point in a circumferential direction of the display surface 112 on the touchscreen 110, the conversion unit 120 shifts the first line 310 and the operation point to be operated 312 by rotating them about the center of the display surface 112.

As another example, when the user moves the touch point along the first line 310 on the touchscreen 110, the conversion unit 120 shifts the operation point to be operated 312 on the first line 310 in the direction in which the user moved the touch point. Alternatively, the conversion unit 120 may shift the first line 310 and the operation point to be operated 312 by rotating them about the center of the display surface 112 in response to the user moving the touch point in a circumferential direction of the display surface 112, and then shift the operation point to be operated 312 on the first line 310 in response to the user moving the touch point in the opposite circumferential direction.

Alternatively, the conversion unit 120 displays an intended operation point reciprocating on the first line 310 within the display surface 112 after the user inputs the first operation point 210 with a touch, and defines the position of the intended operation point at the time the user has ceased touching as the operation point to be operated 312, for example. In addition, the display device 100 may further include an acceleration detection unit 140 and determine the position of the operation point to be operated 312 based on the acceleration given to the display device 100 by the user.

The foregoing variation showed an example where a line on the display surface 112 is defined as the first line 310 in response to the user's input of the first operation point 210. In addition, the position of the operation point to be operated 312 on the first line 310 may be determined in response to the user's input of the second operation point 220.

That is, the conversion unit 120 defines a point on the first line 310 that is in a predetermined positional relationship with the second operation point 220 inputted by the user as the operation point to be operated 312. The conversion unit 120 may define the position of the midpoint of the first line 310 as the position of the operation point to be operated 312. The conversion unit 120 may also shift the operation point to be operated 312 on the first line at a predetermined ratio with respect to the distance by which the user moves the touch point on the touchscreen 110 from the second operation point 220 after inputting the second operation point 220 with a touch. Although the foregoing variation showed an example where the display surface 112 has a substantially circular shape, the display surface 112 may instead be elliptical, oval, or polygonal.

Figure 10:
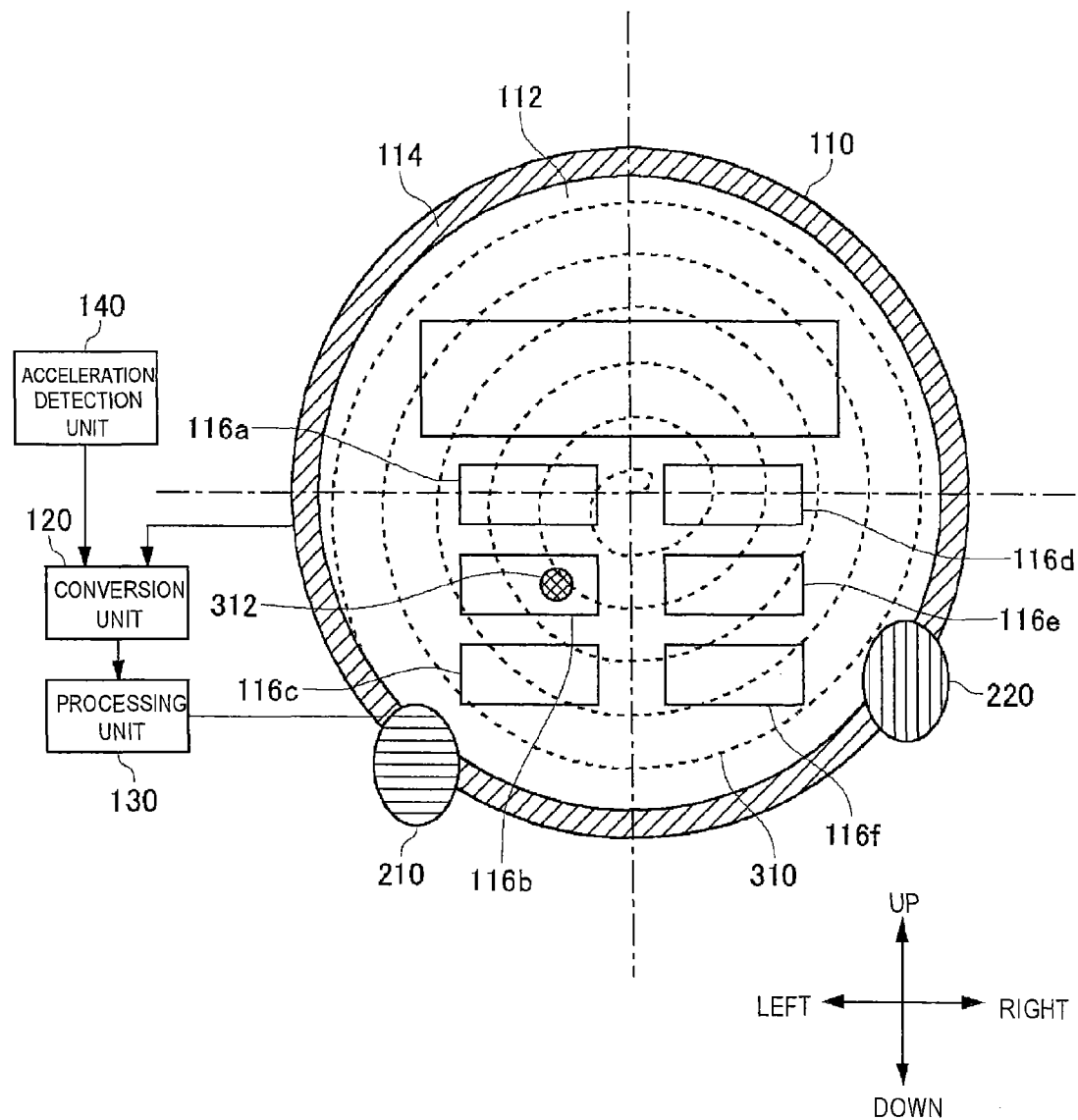
FIG. 10 illustrates an eighth variation of the display device in accordance with an embodiment of the present invention.

FIG. 10 shows an eighth variation of the display device 100 in accordance with an embodiment of the present invention. In relation to the display device 100 in this variation, actions similar to those of the display device 100 of the present embodiment shown in FIG. 3 are denoted with the same reference numerals and their descriptions are omitted. FIG. 10 illustrates an example where the user touches and operates the edge 114 of the display surface 112 in order to manipulate the control 116*b*.

In response to the user's input of the first operation point 210, the conversion unit 120 defines a spiral curve running from the edge 114 of the display surface 112 to the center as the first line 310, and displays an intended operation point reciprocating on the first line 310 within the display surface 112. The conversion unit 120 may reciprocate the intended operation point on the first line 310 from the first operation point 210 to the center of the display surface 112 at a constant speed.

The conversion unit 120 defines the position of the intended operation point at the time the user has ceased touching after touching and inputting the first operation point 210 as the operation point to be operated 312. As described, the display device 100 in the foregoing variation allows the user to manipulate controls 116 displayed in the center area of the display surface 112 except the edge 114 by operating the edge 114 of the display surface 112 on the touchscreen 110.

The conversion unit 120 may adjust the speed of moving the intended operation point in accordance with the distance and direction of the user moving the touch point in a circumferential direction of the display surface 112 on the touchscreen 110 after inputting the first operation point 210 with a touch. The conversion unit 120 may also increase or decrease the density of the spiral of the first line 310 in accordance with the distance and direction of the user moving the touch point in a circumferential direction of the display surface 112 on the touchscreen 110 after touching and inputting the second operation point 220. This enables the user to quickly move the intended operation point onto a control 116 he/she wants to manipulate. Although the foregoing variation showed an example where the display surface 112 has a substantially circular shape, the display surface 112 may instead be elliptical, oval, or polygonal.

Figure 11:
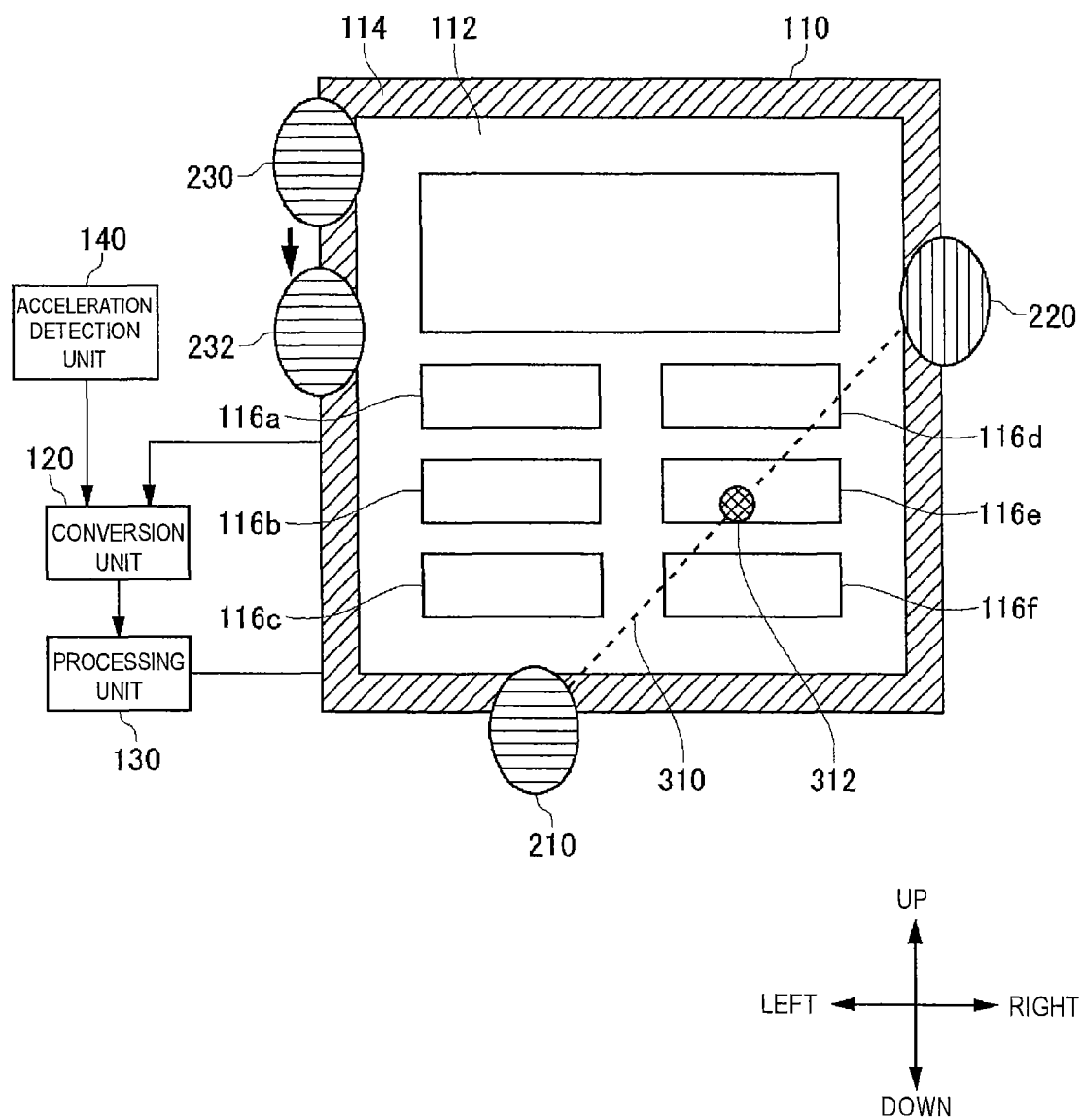
FIG. 11 illustrates a ninth variation of the display device in accordance with an embodiment of the present invention.

FIG. 11 shows a ninth variation of the display device 100 in accordance with an embodiment of the present invention. In relation to the display device 100 in this variation, actions similar to those of the display device 100 of the present embodiment shown in FIGS. 1 to 10 are denoted with the same reference numerals and their descriptions are omitted. The display device 100 in this variation allows the user to scroll through the content displayed on the display surface 112 by operating the edge 114 of the display surface 112.

The conversion unit 120 acquires information on the distance by which the user moved the touch point from a third operation point 230 on the touchscreen 110 after the third operation point 230 was inputted by the user with a touch after inputting the operation point to be operated 312. FIG. 11 illustrates an example where the user moves the third operation point 230 to the operation point 232.

The display device 100 in this variation may adopt any of the input methods employed in the variations described in FIGS. 1 through 10 for inputting the operation point to be operated 312. FIG. 11 shows a case in which the operation point to be operated 312 is input in the manner described in the fifth variation of the display device 100 according to the present embodiment shown in FIG. 7. Although FIG. 11 shows an example where the touchscreen 110 has a rectangular shape, it may instead be elliptical, circular, oval, or polygonal.

The display surface 112 scrolls screen information being displayed by a predetermined amount of scroll based on the distance information. The display surface 112 may receive information on the distance by which the user moved the third operation point 230 from the processing unit 130, or alternatively, from the conversion unit 120. The display device 100 in this variation thus allows the user to scroll through the content displayed on the display surface 112 by operating the edge 114 of the display surface 112 of the touchscreen 110. The display device 100 thereby can adjust the position of the operation point to be operated 312 inputted by the user.

When the user moves the touch point on the first operation point 210 or the second operation point 220 on the touchscreen 110 after the display surface 112 scrolls the content, the conversion unit 120 may shift the first line 310 and/or the operation point to be operated 312 in accordance with the distance of the movement. Thus, the display device 100 in this variation allows the user to manipulate controls 116 that are not initially displayed on the display surface 112 of the touchscreen 110 by operating the edge 114 of the display surface 112.

As described above, the display device 100 according to the embodiment allows the user to manipulate the controls 116 displayed in the center area of the display surface 112 except the edge 114 by operating the edge 114 of the display surface 112 on the touchscreen 110. Alternatively, the display device 100 may allow the user to manipulate a control 116 of interest by the user operating an area of the display surface 112 except the area in which that control 116 is displayed.

Figure 12:
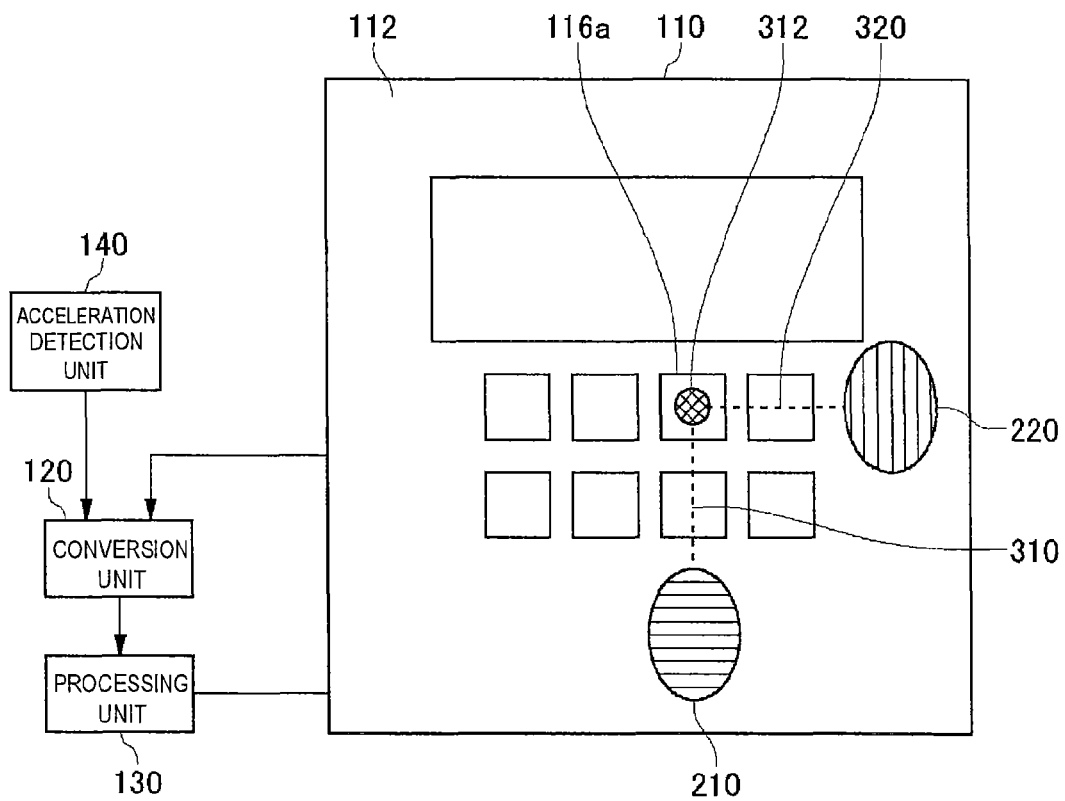
FIG. 12 illustrates a tenth variation of the display device in accordance with an embodiment of the present invention.
Figure 12:
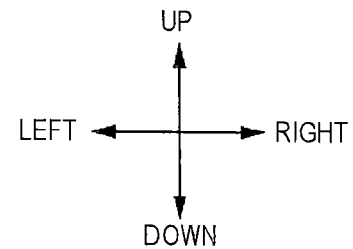
Figure 13:
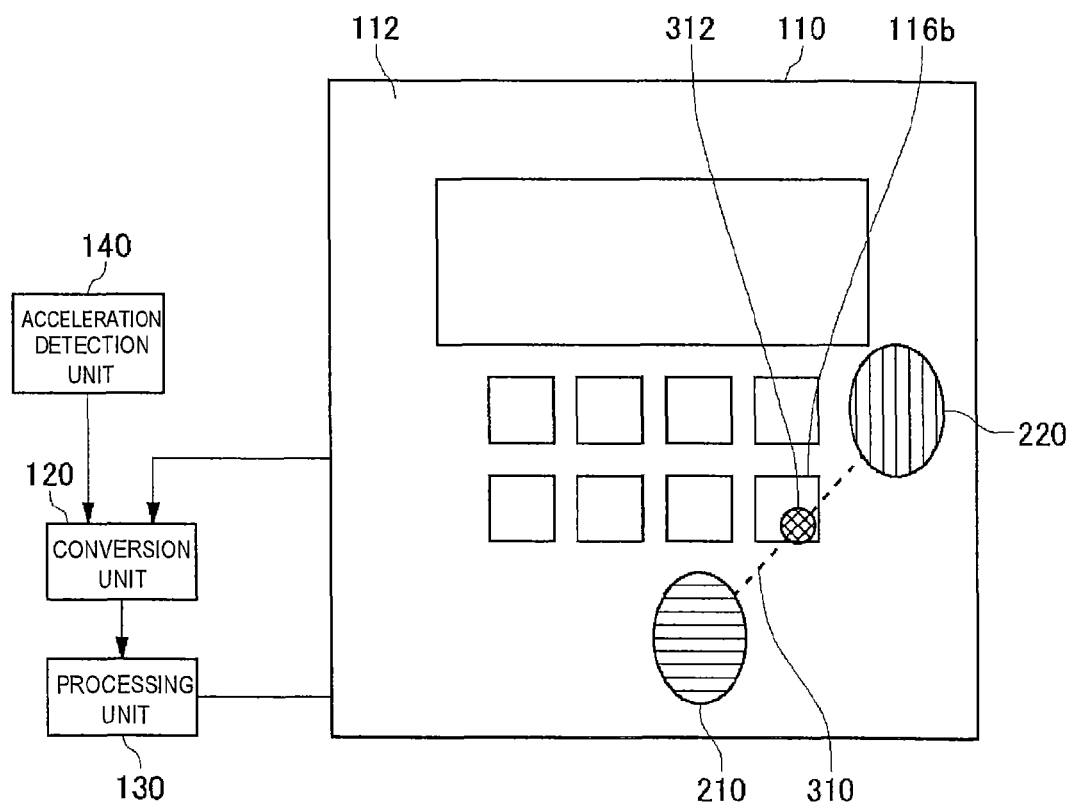
FIG. 13 illustrates an eleventh variation of the display device in accordance with an embodiment of the present invention.
Figure 13:
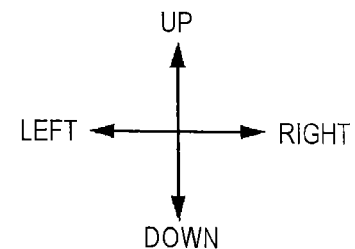
Figure 14:
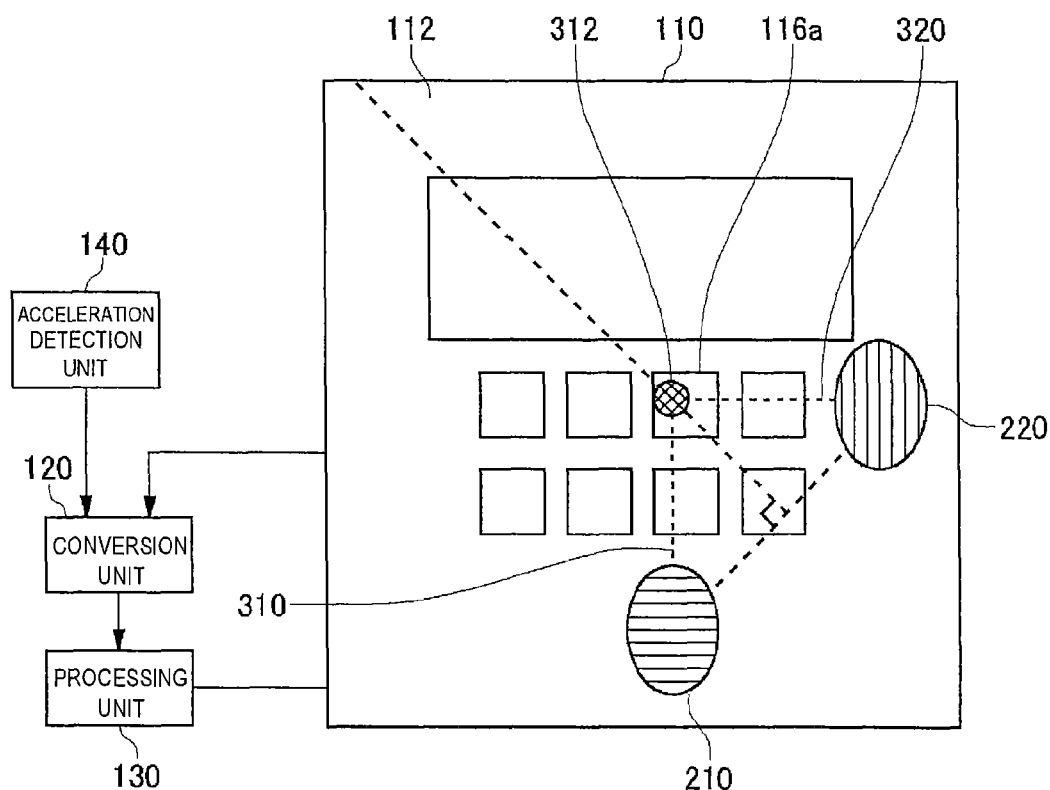
FIG. 14 illustrates a twelfth variation of the display device in accordance with an embodiment of the present invention.
Figure 14:
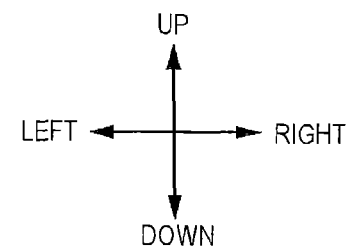

In the variations illustrated in FIGS. 12 to 14, the position of the operation point to be operated 312 is determined in accordance with the user's input of the first operation point 210 and the second operation point 220 in an area of the display surface 112 except the area in which the controls 116 are displayed.

FIG. 12 shows a tenth variation of the display device 100 in accordance with an embodiment of the present invention. In relation to the display device 100 in this variation, actions similar to those of the display device 100 of the present embodiment shown in FIGS. 1 and 6 are denoted with the same reference numerals and their descriptions are omitted. FIG. 12 illustrates an example where the user touches and operates an area of the display surface 112 except the area in which the controls 116 are displayed in order to manipulate the control 116a.

As in the fourth variation, in response to input of the first operation point 210, the conversion unit 120 defines a line that passes through the first operation point 210 and extends in the vertical direction of the display surface 112 as the first line 310. Also, in response to input of the second operation point 220, the conversion unit 120 defines a line that passes through the second operation point 220 and extends in the horizontal direction of the display surface 112 as the second line 320.

Alternatively, the conversion unit 120 may define a line that passes through the first operation point 210 and extends in the horizontal direction of the display surface 112 as the first line 310 and a line that passes through the second operation point 220 and extends in the vertical direction of the display surface 112 as the second line 320. The conversion unit 120 also defines the intersection point of the first line 310 and the second line 320 as the operation point to be operated 312.

FIG. 13 shows an eleventh variation of the display device 100 in accordance with an embodiment of the present invention. In relation to the display device 100 in this variation, actions similar to those of the display device 100 of the present embodiment shown in FIGS. 1 and 7 are denoted with the same reference numerals and their descriptions are omitted. FIG. 13 illustrates an example where the user touches and operates an area of the display surface 112 except the area in which the controls 116 are displayed in order to manipulate the control 116b.

As in the fifth variation, in response to input of the first operation point 210 and the second operation point 220, the conversion unit 120 defines a line in the display surface 112 that passes through the first operation point 210 and the second operation point 220 as the first line 310. The conversion unit 120 also defines a point on the first line 310 that is in a predetermined positional relationship as the operation point to be operated 312.

FIG. 14 shows a twelfth variation of the display device 100 in accordance with an embodiment of the present invention. In relation to the display device 100 in this variation, actions similar to those of the display device 100 of the present embodiment shown in FIGS. 1 and 8 are denoted with the same reference numerals and their descriptions are omitted. FIG. 14 illustrates an example where the user touches and operates an area of the display surface 112 except the area in which the controls 116 are displayed in order to manipulate the control 116a.

As in the sixth variation, the conversion unit 120 defines the two equal sides of an isosceles triangle whose base is the straight line connecting the first operation point 210 and the second operation point 220 in the display surface 112 as the first line 310 and the second line 320 respectively, and defines the intersection point of the first line 310 and the second line 320 as the operation point to be operated 312. In the display surface 112, there can be two such points at positions symmetrical about a straight line connecting the first operation point 210 and the second operation point 220. In such a case, the conversion unit 120 may specify a predetermined one of the points as the operation point to be operated 312 and ignore the other.

As described above, the display device 100 according to the tenth to twelfth variations allows the user to manipulate the controls 116 displayed in the display surface 112 by operating an area of the display surface 112 on the touchscreen 110 except the area in which the controls 116 are displayed.

Figure 15:
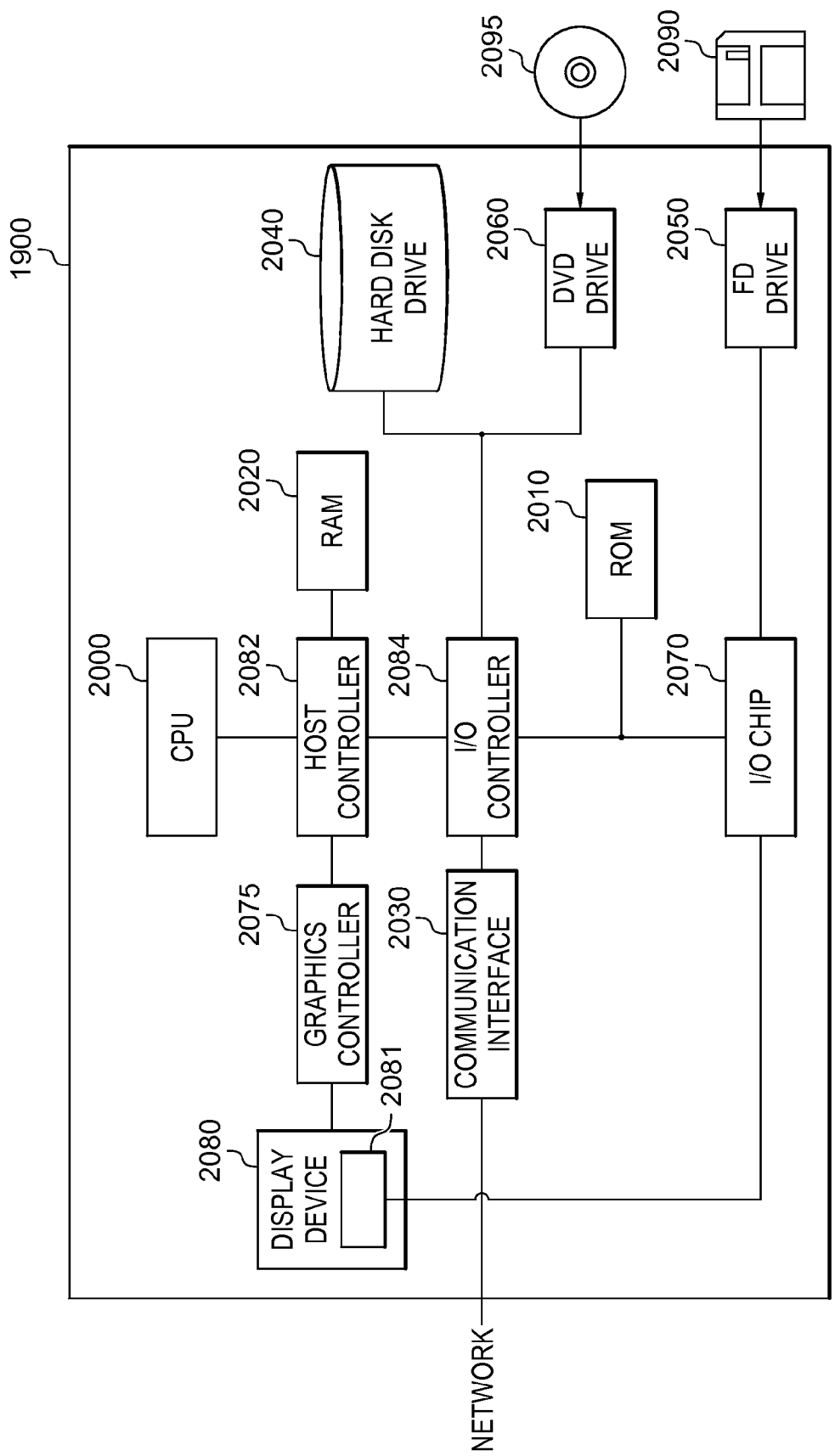
FIG. 15 illustrates a hardware configuration of a computer system in accordance with an embodiment of the present invention.

FIG. 15 shows an exemplary hardware configuration of a computer 1900. The computer 1900 according to the present embodiment includes a CPU peripheral unit having a CPU 2000, a RAM 2020, a graphics controller 2075, and a display device 2080, which are interconnected by a host controller 2082, an input/output unit having a communication interface 2030, a hard disk drive 2040, and a DVD drive 2060, which are connected with the host controller 2082 by an I/O controller 2084, and a legacy input/output unit having a ROM 2010, a Flexible Disk ("FD") drive 2050, and an I/O chip 2070, which are connected to the I/O controller 2084.

The host controller 2082 connects the RAM 2020 with the CPU 2000 and the graphics controller 2075, which access the RAM 2020 at a high transfer rate. The CPU 2000 operates based on programs stored in the ROM 2010 and RAM 2020 and controls components. The graphics controller 2075 acquires image data generated by the CPU 2000 or the like in a frame buffer provided in the RAM 2020, and displays the data on a display device 2080. Alternatively, the graphics controller 2075 may internally include a frame buffer for storing image data generated by the CPU 2000 or the like.

The I/O controller 2084 connects the host controller 2082 with a communication interface 2030, a hard disk drive 2040, and a DVD drive 2060, which are relatively fast input/output devices. The communication interface 2030 communicates with other devices over a network. The hard disk drive 2040 stores programs and data for use by the CPU 2000 in the computer 1900. The DVD drive 2060 reads a program or data from the DVD-ROM 2095 and provides it to the hard disk drive 2040 via the RAM 2020.

The I/O controller 2084 is connected with the ROM 2010, and the flexible disk drive 2050 and I/O chip 2070, which are relatively slow input/output devices. The ROM 2010 stores a boot program executed by the computer 1900 at start-up and/or programs or the like that depend on the hardware of the computer 1900. The flexible disk drive 2050 reads a program or data from the flexible disk 2090 and provides it to the hard disk drive 2040 via the RAM 2020. The I/O chip 2070 connects the touch position detection unit 2081 and the flexible disk drive 2050 with the I/O controller 2084, and also connects various input/output devices with the I/O controller 2084 via, for example, a parallel port, serial port, keyboard port, or mouse port. When the acceleration detection unit 140 (see, for example, FIG. 1) is used as an input/output device, the I/O chip 2070 is connected with the acceleration detection unit 140, connecting the acceleration detection unit 140 to the I/O controller 2084.

A program provided to the hard disk drive 2040 via the RAM 2020 is supplied by the user being stored on a recording medium such as the flexible disk 2090, DVD-ROM 2095, or an IC card. The program is read from the recording medium, installed in the hard disk drive 2040 in the computer 1900 via the RAM 2020, and executed by the CPU 2000.

The program is installed in the computer 1900 to cause the computer 1900 to function as the display device 100 (FIGS. 1 and 3-14). The touchscreen 110 represents a display device 2080 having a touch position detection unit 2081, which may be a touch sensor or the like. The touch position detection unit 2081 is connected to the I/O chip 2070.

Information processing written in the program is read into the computer 1900 to function as the display device 100, which is concrete means achieved by cooperation of software and the various hardware resources mentioned above. The concrete means in turn implements information computing or editing as appropriate for the intended use of the computer 1900 in the present embodiments, thereby implementing specific touchscreen 110, conversion unit 120, and processing unit 130 adapted to the purpose of use.

By way of example, when the computer 1900 communicates with an external device or the like, the CPU 2000 executes a communications program loaded in the RAM 2020, and specifies communication processing to the communication interface 2030 based on processing actions written in the communications program. The communication interface 2030 reads outgoing data stored in a send buffer area or the like provided in a storage device, such as RAM 2020, hard disk drive 2040, flexible disk 2090, or DVD-ROM 2095 and sends it to a network, or writes data received from the network in a receive buffer area or the like provided in the storage device, under control of the CPU 2000. Thus, the communication interface 2030 may transfer outgoing/incoming data to and from the storage device by DMA (Direct Memory Access), or alternatively, the CPU 2000 may transfer outgoing/incoming data by reading data from a source storage device or communication interface 2030 and writing the data into a destination communication interface 2030 or storage device.

The CPU 2000 also loads all or a necessary portion of data in a file or database stored in an external storage device, such as the hard disk drive 2040, DVD drive 2060 (DVD-ROM 2095), flexible disk drive 2050 (flexible disk 2090) into the RAM 2020 by DMA transfer or the like, and performs various kinds of processing on the data in the RAM 2020. The CPU 2000 then writes processed data back into the external storage device, such as by DMA transfer. Since the RAM 2020 can be considered to temporarily hold contents of the external storage device in such a process, the present embodiment generically calls the RAM 2020 and external storage devices or the like as memory, storage unit, or storage device. Various programs and various kinds of information such as data, tables, and databases in the present embodiment are stored in such a storage device to go through information processing. The CPU 2000 can also maintain part of data in the RAM 2020 in a cache memory and read/write data in the cache memory. Since cache memory shares a part of functions of the RAM 2020 also in such a form, cache memory is also included in the RAM 2020, memory, and/or a storage device in the present embodiment unless specifically identified.

The CPU 2000 also performs various kinds of processing specified by instruction sequences of a program, including various kinds of computation, information editing, conditional determination, information retrieval and replacement described in the embodiments above, on data read from the RAM 2020 and writes back the resulting data to the RAM 2020. In the case of conditional determination, for example, the CPU 2000 determines if a variable shown in the embodiment satisfies a certain condition, such as being greater than, less than, equal to or greater than, equal to or less than, or equal to another variable or a constant, and branches to a different instruction sequence or invokes a sub-routine if the condition is satisfied (or is not satisfied).

The CPU 2000 can also search information stored in a file or a database in a storage device. For example, when multiple entries in each of which includes a first attribute value and the associated second attribute are stored in the storage device, the CPU 2000 searches for an entry whose first attribute value matches a specified condition from the multiple entries stored in the storage device, and reads the second attribute value stored in an entry found, thereby determining the second attribute value associated with the first attribute value matching the condition.

The program or module shown above may be stored in an external recording medium. In addition to the flexible disk 2090 and the DVD-ROM 2095, the recording medium may be an optical recording medium such as DVD or CD, a magneto-optical recording medium, such as an MO, tape medium, or a semiconductor memory, such as an IC card. Also, a storage medium, such as a hard disk or RAM, provided in a server system connected to a dedicated communication network or the Internet may be used as the recording medium, and the program may be supplied to the computer 1900 over the network.

It should be noted that processes, such as actions, procedures, steps, and stages associated with the devices, systems, programs, and methods shown in Claims, descriptions of the embodiments, and drawings may take place in any order unless specifically noted as "before" or "prior to" or unless output from a preceding process is used in a subsequent process. Even if terms like "first" or "next" are used in relation to operational flows in Claims, descriptions of the embodiments and drawings for the sake of description, it is not intended to mean performance in the order is essential.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating operation of controls displayed on a display surface of a display device independently of a size of said display surface, the method comprising:
    detecting a touch along an edge of said display surface, wherein said edge is an operational area operated by a user;
    translating said detected touch into a first operation point along said edge;
    defining a line that forms a two-dimensional figure on said display surface in response to said user selecting said first operation point along said edge;
    defining a point on said line corresponding to an operation point to be operated on said display surface based on a second operation point along said edge selected by said user with a touch; and
    sending position information for said operation point to be operated on said display surface to a processing unit which processes an execution of a control located at a position on said display surface corresponding to a position of said operation point to be operated on said display surface.

2. The method as recited in claim 1 further comprising:
    enlarging or reducing said figure at a predetermined ratio with respect to a distance by which said user moves a touch point from said first operation point along said edge.

3. The method as recited in claim 1 further comprising:
    shifting said operation point to be operated on said display surface at a predetermined ratio with respect to a distance by which said user moves a touch point from said second operation point along said edge after said user selected said second operation point along said edge with said touch.

4. The method as recited in claim 1 further comprising:
    detecting a final determination of said operation point to be operated on said display surface by detecting an action of said user comprising one of the following: ceasing touching said first operation point and said second operation point, inputting a third operation point, moving said display device to give it an acceleration and tilting said display device.

5. The method as recited in claim 1, wherein said edge corresponds to one or more sides of said display surface.

6. The method as recited in claim 1, wherein said edge corresponds to four sides of a rectangular display surface.

7. The method as recited in claim 1, wherein said edge corresponds to a part of a side of said display surface.

8. A computer program product for facilitating operation of controls displayed on a display surface of a display device independently of a size of said display surface, the computer program product comprising a non-transitory computer readable storage medium having program code embodied therewith, the program code comprising the programming instructions for:
    detecting a touch along an edge of said display surface, wherein said edge is an operational area operated by a user;
    translating said detected touch into a first operation point along said edge;
    defining a line that forms a two-dimensional figure on said display surface in response to said user selecting said first operation point along said edge;
    defining a point on said line corresponding to an operation point to be operated on said display surface based on a second operation point along said edge selected by said user with a touch; and
    sending position information for said operation point to be operated on said display surface to a processing unit which processes an execution of a control located at a position on said display surface corresponding to a position of said operation point to be operated on said display surface.

9. The computer program product as recited in claim 8, wherein the program code further comprises the programming instructions for:
    enlarging or reducing said figure at a predetermined ratio with respect to a distance by which said user moves a touch point from said first operation point along said edge.

10. The computer program product as recited in claim 8, wherein the program code further comprises the programming instructions for:
    shifting said operation point to be operated on said display surface at a predetermined ratio with respect to a distance by which said user moves a touch point from said second operation point along said edge after said user selected said second operation point along said edge with said touch.

11. The computer program product as recited in claim 8, wherein the program code further comprises the programming instructions for:
    detecting a final determination of said operation point to be operated on said display surface by detecting an action of said user comprising one of the following: ceasing touching said first operation point and said second operation point, inputting a third operation point, moving said display device to give it an acceleration and tilting said display device.

12. The computer program product as recited in claim 8, wherein said edge corresponds to one or more sides of said display surface.

13. The computer program product as recited in claim 8, wherein said edge corresponds to four sides of a rectangular display surface.

14. The computer program product as recited in claim 8, wherein said edge corresponds to a part of a side of said display surface.

15. A display device, comprising:
    a processing unit;
    a touch position detection unit connected to said processing unit, wherein said touch position detection unit corresponds to an edge of said display surface that is configured to detect a touch along said edge of said display surface, wherein said edge is an operational area operated by a user; and
    a conversion unit connected to said processing unit, wherein said conversion unit is configured to translate said detected touch into a first operation point along said edge, wherein said conversion unit is further configured to define a line that forms a two-dimensional figure on said display surface in response to said user selecting said first operation point along said edge, wherein said conversion unit is further configured to define a point on said line corresponding to an operation point to be operated on said display surface based on a second operation point along said edge selected by said user with a touch, wherein said conversion unit is further configured to send position information for said operation point to be operated on said display surface to said processing unit which processes an execution of a control located at a position on said display surface corresponding to a position of said operation point to be operated on said display surface.

16. The system as recited in claim 15, wherein said conversion unit is further configured to enlarge or reduce said figure at a predetermined ratio with respect to a distance by which said user moves a touch point from said first operation point along said edge.

17. The system as recited in claim 15, wherein said conversion unit is further configured to shift said operation point to be operated on said display surface at a predetermined ratio with respect to a distance by which said user moves a touch point from said second operation point along said edge after said user selected said second operation point along said edge with said touch.

18. The system as recited in claim 15, wherein said conversion unit is further configured to detect a final determination of said operation point to be operated on said display surface by detecting an action of said user comprising one of the following: ceasing touching said first operation point and said second operation point, inputting a third operation point, moving said display device to give it an acceleration and tilting said display device.

19. The system as recited in claim 15, wherein said edge corresponds to one or more sides of said display surface.

20. The system as recited in claim 15, wherein said edge corresponds to four sides of a rectangular display surface.

21. The system as recited in claim 15, wherein said edge corresponds to a part of a side of said display surface.

* * * * *